US009886228B2

(12) United States Patent
Kim et al.

(10) Patent No.: US 9,886,228 B2
(45) Date of Patent: Feb. 6, 2018

(54) METHOD AND DEVICE FOR CONTROLLING MULTIPLE DISPLAYS USING A PLURALITY OF SYMBOL SETS

(71) Applicant: Samsung Electronics Co., Ltd., Suwon-si, Gyeonggi-do (KR)

(72) Inventors: Seongeun Kim, Hwaseong-si (KR); Myunghun Bae, Seoul (KR); Junyun Kim, Yongin-si (KR); Jungsik Park, Suwon-si (KR); Heungsik Shin, Jeonju-si (KR); Sejun Song, Seoul (KR); Myunggon Hong, Seongnam-si (KR); Hyunju Hong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 14/706,252

(22) Filed: May 7, 2015

(65) Prior Publication Data

US 2015/0324162 A1 Nov. 12, 2015

(30) Foreign Application Priority Data

May 9, 2014 (KR) ........................ 10-2014-0055443

(51) Int. Cl.
*G06F 3/14* (2006.01)
*G06F 1/16* (2006.01)
*G06F 3/0488* (2013.01)
*G06F 3/147* (2006.01)

(52) U.S. Cl.
CPC .......... *G06F 3/1438* (2013.01); *G06F 1/1641* (2013.01); *G06F 1/1643* (2013.01); *G06F 1/1647* (2013.01); *G06F 3/04886* (2013.01); *G06F 3/147* (2013.01); *H04M 2250/58* (2013.01)

(58) Field of Classification Search
CPC .. G06F 3/1438; G06F 3/04886; G06F 1/1641; G06F 1/1643; G06F 1/1647; H04M 2250/58
See application file for complete search history.

(56) References Cited

U.S. PATENT DOCUMENTS

| 5,128,672 A | 7/1992 | Kaehler | |
| 6,313,735 B1* | 11/2001 | Higuchi | G08B 5/225 340/7.54 |
| 2005/0237699 A1* | 10/2005 | Carroll | G06F 1/1616 361/600 |

(Continued)

FOREIGN PATENT DOCUMENTS

| JP | 2013-541100 A | 11/2013 |
| KR | 10-1152293 B1 | 5/2012 |

OTHER PUBLICATIONS

Victor Matos: "Android Hard & Soft Keyboards", Jan. 1, 2008, XP055207355.
Anonymous: "Managing the Keyboard", Mar. 10, 2014, XP055207357.

*Primary Examiner* — Larry Sternbane
(74) *Attorney, Agent, or Firm* — Jefferson IP Law, LLP

(57) ABSTRACT

A method of using an electronic device is provided. The method includes displaying a first input region corresponding to a first language or symbol set through a first or second display of an electronic device and displaying a second input region corresponding to a second language or symbol set through the first or second display. In addition, other embodiments can be made.

18 Claims, 32 Drawing Sheets

(56) References Cited

U.S. PATENT DOCUMENTS

| | | |
|---|---|---|
| 2008/0077393 A1 | 3/2008 | Gao et al. |
| 2009/0225041 A1 | 9/2009 | Kida et al. |
| 2011/0109567 A1 | 5/2011 | Kim et al. |
| 2011/0261058 A1 | 10/2011 | Luo |
| 2011/0285631 A1 | 11/2011 | Imamura et al. |
| 2012/0176320 A1 | 7/2012 | Burrell, IV |
| 2012/0310622 A1 | 12/2012 | Zivkovic et al. |
| 2012/0313858 A1 | 12/2012 | Park et al. |
| 2013/0007875 A1* | 1/2013 | Jakobsson ............ G06F 9/4448 726/19 |
| 2013/0076677 A1* | 3/2013 | Kretz .................... G06F 3/1438 345/173 |
| 2013/0203469 A1 | 8/2013 | Cho et al. |
| 2013/0297287 A1* | 11/2013 | Yin ....................... G06F 17/289 704/3 |
| 2013/0305179 A1 | 11/2013 | Griffin |
| 2013/0321340 A1 | 12/2013 | Seo et al. |
| 2014/0040810 A1 | 2/2014 | Haliburton et al. |
| 2014/0134985 A1* | 5/2014 | Ezequiel ............... G06F 9/4448 455/414.1 |
| 2014/0188455 A1* | 7/2014 | Manuselis ............ G06F 17/289 704/3 |
| 2014/0281995 A1* | 9/2014 | Kim ....................... G06F 3/167 715/719 |
| 2015/0095011 A1* | 4/2015 | Furihata ............... G06F 17/289 704/2 |

\* cited by examiner

METHOD AND DEVICE FOR CONTROLLING MULTIPLE DISPLAYS USING A PLURALITY OF SYMBOL SETS

CROSS-REFERENCE TO RELATED APPLICATION(S)

This application claims the benefit under 35 U.S.C. §119(a) of a Korean patent application filed on May 9, 2014 in the Korean Intellectual Property Office and assigned Serial number 10-2014-0055443, the entire disclosure of which is hereby incorporated by reference.

TECHNICAL FIELD

The present disclosure relates to a method and device for controlling multiple displays. More particularly, the present disclosure relates to a method and device that allows a user to perform various types of input in relation to multiple displays.

BACKGROUND

Electronic devices may be important means for transferring various types of information to users. Various types of information of the electronic devices may be displayed to the users through displays. The displays may display more diverse types of information as the sizes of the displays become larger. If the number of displays is increased with the increasing size thereof, the electronic devices can transfer a larger amount of information to the users, thereby enhancing user convenience. In addition, the electronic devices may provide diverse input means (e.g., keypads) for receiving user input for various types of information. The electronic devices may provide various types of information to the users using multiple displays and may provide an interface that allows the users to use such various types of information through the displays.

The above information is presented as background information only to assist with an understanding of the present disclosure. No determination has been made, and no assertion is made, as to whether any of the above might be applicable as prior art with regard to the present disclosure.

SUMMARY

Although the sizes of displays are becoming larger, information displayed on the displays may be restricted within a predetermined range due to a limitation of space where the displays are mounted in electronic devices. When information (e.g., Alphabet, Hangeul consonants, Hangeul vowels, or numbers) that can be input through an input means (e.g., a keypad) is displayed on the displays, the amount of information displayed at one time is prescribed depending upon the sizes of the displays. Due to this, users have to frequently change a combination of the displayed information (e.g., a language or symbol set) in order to input desired information. Therefore, if the input means (e.g., keypad) is not provided efficiently, use convenience may be deteriorated.

Aspects of the present disclosure are to address at least the above-mentioned problems and/or disadvantages and to provide at least the advantages described below. Accordingly, an aspect of the present disclosure is to provide a method and device that can efficiently represent a plurality of input means (e.g., keypads) through multiple displays, thereby increasing use convenience when a user performs various types of input.

Another aspect of the present disclosure is to provide a method and device that can provide a user with information on an input means through at least one of multiple displays and control at least one of the multiple displays.

Another aspect of the present disclosure is to provide a method and device that can transfer various types of information related to input means between multiple displays according to situation information of an electronic device (e.g., information on displayed text), thereby implementing an interface capable of enhancing user convenience associated with input.

In accordance with an aspect of the present disclosure, an input method is provided. The input method includes displaying a first input region corresponding to a first language or symbol set through a first or second display of an electronic device and displaying a second input region corresponding to a second language or symbol set through the first or second display.

In accordance with another aspect of the present disclosure, an electronic device is provided. The electronic device includes a plurality of displays including at least first and second displays and a display control module functionally connected to the plurality of displays, wherein the display control module is set to display a first input region corresponding to a first language or symbol set and a second input region corresponding to a second language or symbol set through the first and second displays.

Various embodiments of the present disclosure provide an electronic device and a method that can provide at least one input means (e.g., a keypad) to a user using a plurality of displays. According to the various embodiments of the present disclosure, the at least one input means can be set to represent information, which can be input, according to a situation related to the electronic device, thereby enhancing input convenience.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
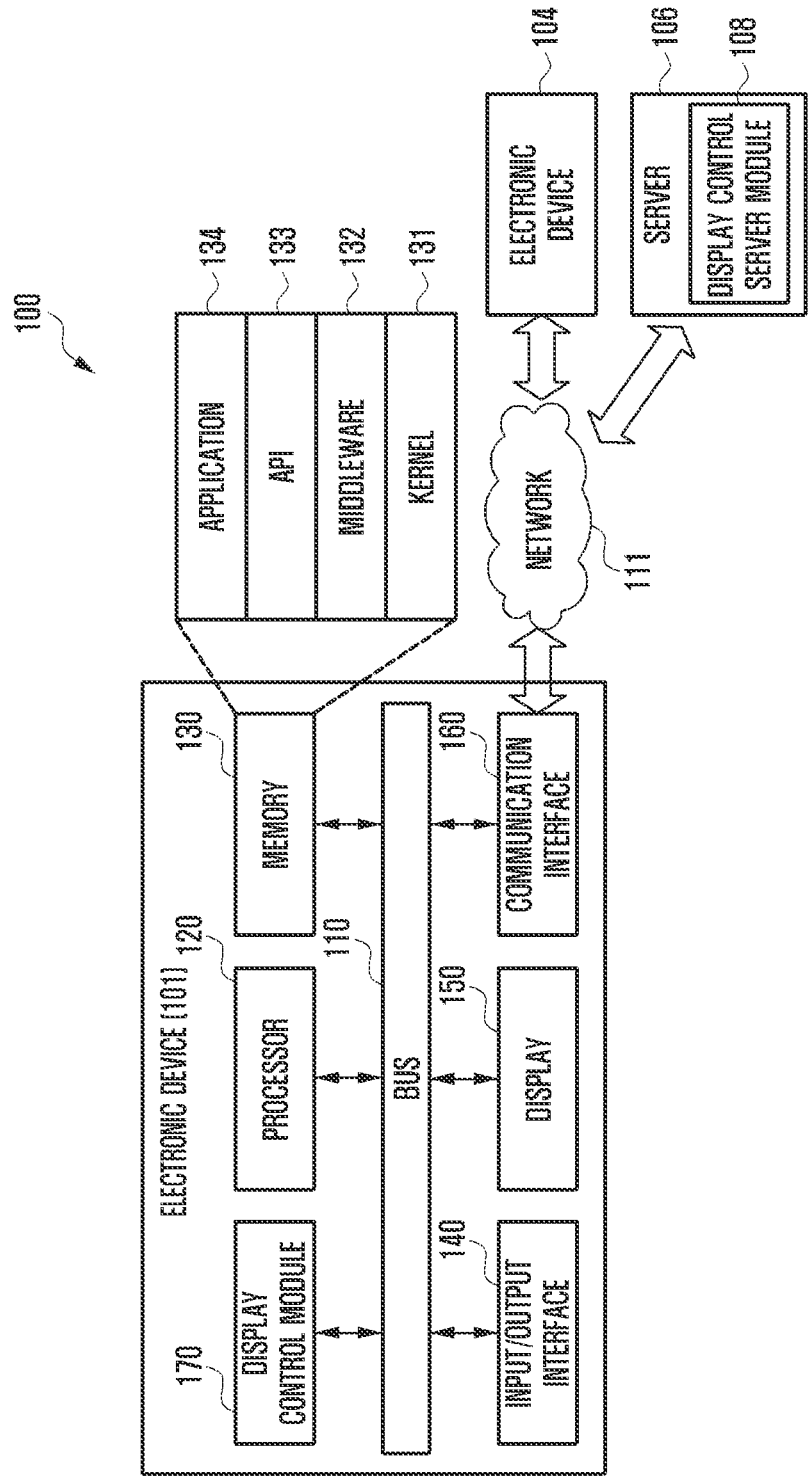
FIG. 1A schematically illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, operation, constituent element, component or a combination thereof, but may not be construed to exclude the existence of or a possibility of the addition of one or more other characteristics, numbers, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., and/or the like, may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although for both of them the first user device and the second user device are user devices. For example, a first element could be termed a second element, and similarly, a second element could be also termed a first element without departing from the scope of the present disclosure.

In the case where according to which a component is referred to as being "connected" or "accessed" to other component, it should be understood that not only the component is directly connected or accessed to the other component, but also another component may exist between the component and the other component. Meanwhile, in the case where according to which a component is referred to as being "directly connected" or "directly accessed" to other component, it should be understood that there is no component therebetween.

The terms used in the present disclosure are only used to describe specific various embodiments, and are not intended to limit the present disclosure. Singular forms are intended to include plural forms unless the context clearly indicates otherwise.

Unless otherwise defined, all terms including technical and/or scientific terms used herein have the same meaning as commonly understood by one of ordinary skill in the art to which the disclosure pertains. In addition, unless otherwise defined, all terms defined in generally used dictionaries may not be overly interpreted.

For example, the electronic device corresponds to a combination of at least one of the followings: a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player (e.g., digital audio player), a mobile medical device, a camera, or a wearable device. Examples of the wearable device are a head-mounted-device (HMD) (e.g., electronic eyeglasses), electronic clothing, an electronic bracelet, an electronic necklace, an appcessory, an electronic tattoo, a smart watch, etc.

The electronic device according to the various embodiments of the present disclosure may be smart home appliances. Examples of the smart home appliances are a television (TV), a Digital Versatile Disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like.

The electronic device according to the various embodiments of the present disclosure may include at least one of the following: medical devices (e.g., Magnetic Resonance Angiography (MRA), Magnetic Resonance Imaging (MRI), Computed Tomography (CT), a scanning machine, an ultrasonic scanning device, etc.), a navigation device, a Global Positioning System (GPS) receiver, an Event Data Recorder (EDR), a Flight Data Recorder (FDR), a vehicle infotainment device, an electronic equipment for ships (e.g., navigation equipment, gyrocompass, etc.), avionics, a security device, a head unit for vehicles, an industrial or home robot, an automatic teller's machine (ATM), a point of sales (POS) system, etc.

The electronic device according to the various embodiments of the present disclosure may include at least one of the following: furniture or a portion of a building/structure, an electronic board, an electronic signature receiving device, a projector, various measuring instruments (e.g., a water meter, an electric meter, a gas meter and a wave meter), etc. respectively. The electronic device according to the various embodiments of the present disclosure may also include a combination of the devices listed above. In addition, the electronic device according to the various embodiments of the present disclosure may be a flexible device. It is obvious to those skilled in the art that the electronic device according to the various embodiments of the present disclosure is not limited to the aforementioned devices.

In the description, the term a 'user' may be referred to as a person or a device that uses an electronic device, e.g., an artificial intelligent electronic device.

FIG. 1A illustrates a network environment 100 including an electronic device 101 according to an embodiment of the present disclosure.

Referring to FIG. 1, the electronic device 101 may include a bus 110, a processor 120, a memory 130, an input/output (I/O) interface 140, a display 150, a communication interface 160 and a display control module 170.

The bus 110 may be a communication circuit that connects the components to each other and transfers data (e.g., control messages) between the components.

The processor 120 may receive instructions from the components (e.g., the memory 130, input/output interface 140, display 150, communication interface 160, display control module 170, etc.) via the bus 110, decode them and perform corresponding operations or data processing according to the decoded instructions.

The memory 130 may store instructions or data transferred from/created in the processor 120 or the other components (e.g., the input/output interface 140, display 150, communication interface 160, display control module 170, etc.). The memory 130 may include programming modules, e.g., a kernel 131, middleware 132, application programming interface (API) 133, application module 134, etc. Each of the application modules may be software, firmware, hardware or a combination thereof.

The kernel 131 may control or manage system resources (e.g., the bus 110, processor 120, memory 130, etc.) used to execute operations or functions of the programming modules, e.g., the middleware 132, API 133, and application module 134. The kernel 131 may also provide an interface that can access and control/manage the components of the electronic device 101 via the middleware 132, API 133, and application module 134.

The middleware 132 may make it possible for the API 133 or application module 134 to perform data communication with the kernel 131. The middleware 132 may also perform control operations (e.g., scheduling, load balancing) for task requests transmitted from the application module 134 by methods, for example, a method for assigning the order of priority to use the system resources (e.g., the bus 110, processor 120, memory 130, etc.) of the electronic device 101 to at least one of the applications of the application module 134.

The application programming interface (API) 133 is an interface that allows the application module 134 to control functions of the kernel 131 or middleware 132. For example, the API 133 may include at least one interface or function (e.g., instruction) for file control, window control, character control, video process, etc.

In various embodiments of the present disclosure, the application module 134 may include applications that are related to: Short Message Service (SMS)/Multimedia Messaging Service (MMS), email, calendar, alarm, health care (e.g., an application for measuring the blood sugar level, a workout application, etc.), environment information (e.g., atmospheric pressure, humidity, temperature, etc.), and so on. The application module 134 may be an application related to exchanging information between the electronic device 101 and the external electronic devices (e.g., an electronic device 104). The information exchange-related application may include a notification relay application for transmitting specific information to an external electronic device or a device management application for managing external electronic devices.

For example, the notification relay application may include a function for transmitting notification information, created by the other applications of the electronic device 101 (e.g., SMS/MMS application, email application, health care application, environment information application, etc.), to an external electronic device (e.g., electronic device 104). In addition, the notification relay application may receive notification information from an external electronic device (e.g., electronic device 104) and provide it to the user. The device management application can manage (e.g., to install, delete, or update): part of the functions of an external electronic device (e.g., electronic device 104) communicating with the electronic device 101, e.g., turning on/off the external electronic device, turning on/off part of the components of the external electronic device, adjusting the brightness (or the display resolution) of the display of the external electronic device, etc.; applications operated in the external electronic device; or services from the external electronic device, e.g., call service or messaging service, etc.

In various embodiments of the present disclosure, the application module 134 may include applications designated according to attributes (e.g., type of electronic device) of the external electronic device (e.g., electronic device 104). For example, if the external electronic device is a digital audio player, the application module 134 may include an application related to music playback. If the external electronic device is a mobile medical device, the application module 134 may include an application related to health care. In an embodiment of the present disclosure, the application module 134 may include at least one of the following: an application designated in the electronic device 101 and applications transmitted from external electronic devices (e.g., server 106, electronic device 104, etc.).

The input/output interface 140 may receive instructions or data from the user via an input/output system (e.g., a sensor, keyboard or touch screen) and transfers them to the processor 120, memory 130, communication interface 160 or display control module 170 through the bus 110. For example, the input/output interface 140 may provide data corresponding to a user's touch input to a touch screen to the processor 120. The input/output interface 140 may receive instructions or data from the processor 120, memory 130, communication interface 160 or display control module 170 through the bus 110, and output them to an input/output system (e.g., a speaker or a display). For example, the input/output interface 140 may output voice data processed by the processor 120 to the speaker.

The display 150 may display various types of information (e.g., multimedia data or text data) to a user. According to various embodiments, the display 150 may include, for example, a plurality of displays. According to an embodiment, the plurality of displays may be set such that relative positions thereof can be changed. According to an embodiment, at least one of the displays may include, for example, an input region for keypad input.

According to an embodiment, the display 150 may display a virtual keypad through the input region. The virtual keypad may include keys for representing information which can be input based on various languages or symbol sets (e.g., Alphabet, Hangeul, and Hiragana).

According to an embodiment, the input region capable of detecting, for example, input through an electronic pen may be displayed through the display 150. For example, information input through the input region may be converted into values (e.g., the ASCII code) matched with a particular language or symbol set (e.g., Alphabet, Hangeul, or Hiragana) and may be recognized by the electronic device 101. According to an embodiment, the input region may be a region capable of detecting a touch or hovering input through a user's body part (e.g., a finger) as well as an electronic pen.

The communication interface 160 may communicate between the electronic device 101 and an external system (e.g., an electronic device 104 or server 106). For example, the communication interface 160 may connect to a network 111 in wireless or wired mode and communicate with the external system. Wireless communication may include at least one of the following: Wireless Fidelity (Wi-Fi), Bluetooth (BT), near field communication (NFC), global positioning system (GPS) or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile communications (GSM), etc.). Wired communication may include at least one of the following: universal serial bus (USB), high definition multimedia interface (HDMI), recommended standard 232 (RS-232), plain old telephone service (POTS), etc.

In an embodiment of the present disclosure, the network 111 may be a telecommunication network. The telecommunication network may include at least one of the following a computer network, Internet, Internet of things, telephone network, etc. The protocol for communication between the electronic device 101 and the external system, e.g., transport layer protocol, data link layer protocol, or physical layer protocol, may be supported by at least one of the following: application module 134, API 133, middleware 132, kernel 131 and communication interface 160.

According to an embodiment, the server 106 may support the driving of the electronic device 101 by performing at least one operation (or function) implemented in the electronic device 101. For example, the server 106 may include a display control server module 108 that can support the display control module 170 implemented in the electronic device 101. For example, the display control server module 108 may include at least one element of the display control module 170 to perform at least one of the operations performed by the display control module 170 (e.g., execute at least one operation on behalf of the display control module).

The display control module 170 may control the display 150 to process at least some pieces of information acquired from the other elements (e.g., the processor 120, the memory 130, the input/output interface 140, and the communication interface 160) and provide the processed information to a user through various methods. For example, using the processor 120 or independently of the processor 120, the display control module 170 may create information to display through the display 150 and determine a location where the created information will be displayed. For example, in cases where the display 150 includes a plurality of displays, the display control module 170 may display particular information on at least one of the displays.

According to an embodiment, at least a part of the display control module 170 may be, for example, a graphic processor. According to an embodiment, at least a part of the display control module 170 may be included as a part of logic performed by the processor 120. Additional information on the display control module 170 will be provided through FIG. 1B described below.

Figure 1B:
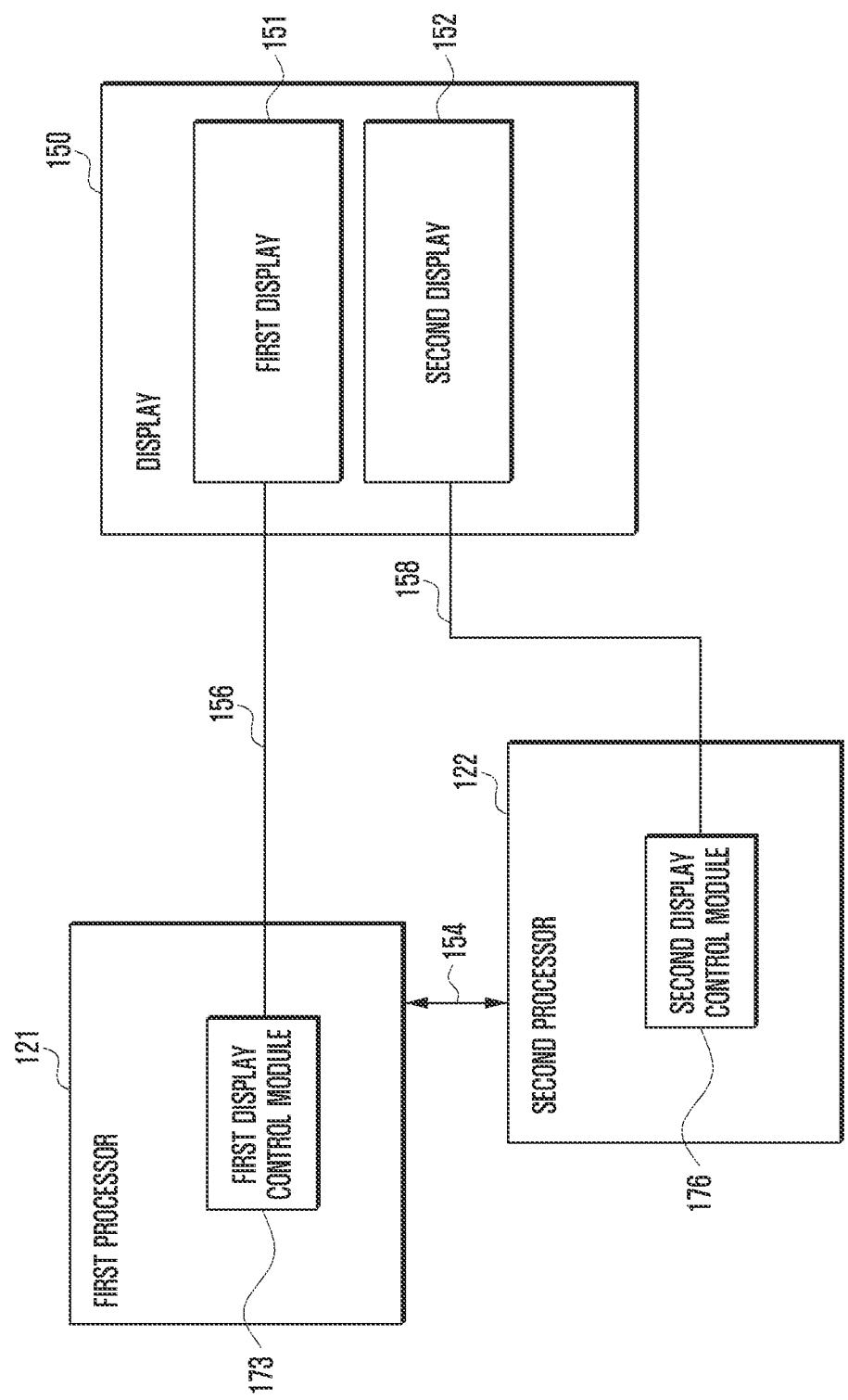
FIG. 1B illustrates a structure of a display control module of the electronic device according various embodiments of the present disclosure.

FIG. 1B illustrates a hardware structure of a display control module (e.g., the display control module 170 illustrated in FIG. 1) of the electronic device (e.g., the electronic device 101) according to various embodiments of the present disclosure.

Referring to FIG. 1B, the display control module 170 may include at least a first display control module 173 or a second display control module 176. The first or second display control module 173 or 176 may be included as a part of logic performed by a corresponding one of a first processor 121 and a second processor 122. The first processor 121 and the second processor 122 may communicate via control line 154. The display 150 may include, for example, a first display 151 or a second display 152. The first processor 121 may include an additional display control module (e.g., a third display control module (not illustrated)) in addition to the first or second display control module 173 or 176.

The first or second display control module 173 or 176 may control, for example, at least one of the first and second displays 151 and 152 to display information thereon. The first display control module 173 may control, for example, both the first and second displays 151 and 152 or a corresponding one of the first and second displays 151 and 152 through control line 156. The second display control module 176 may also control, for example, both the first and second displays 151 and 152 or a corresponding one of the first and second displays 151 and 152 through control line 158.

According to an embodiment, at least a part of the first display control module 173 may be included in the first processor 121, and at least a part of the second display control module 176 may be included in the second processor 122. This is only an embodiment, and at least a part of the first display control module 173 may be included in the second processor 122 or at least a part of the second display control module 176 may be included in the first processor 121. Alternatively, the first and second display control modules 173 and 176 may also be included only in one of the first and second processors 121 and 122. According to various embodiments, the locations of the first and second display control modules 173 and 176 are not limited.

According to various embodiments, at least one of the first and second display control modules 173 and 176 may adjust an attribute, for example, size, shape, brightness, luminance, color, saturation, definition, transparency, gamma, resolution, contrast ratio, viewing angle, color reproduction range, color temperature, grayscale linearity, transmittance, or contrast of at least one of the first and second displays 151 and 152.

According to various embodiments, at least one of the first and second display control modules 173 and 176 may determine information (e.g., a first language, a second language, a first symbol set, or a second symbol set) that has to be displayed on at least one of the first and second displays 151 and 152. At least one of the first and second display control modules 173 and 176 may control to display the first language through the first display 151 and the second language through the second display 152. Additional information on the first or second display control module 173 or 176 is provided through the following drawings.

Figure 1C:
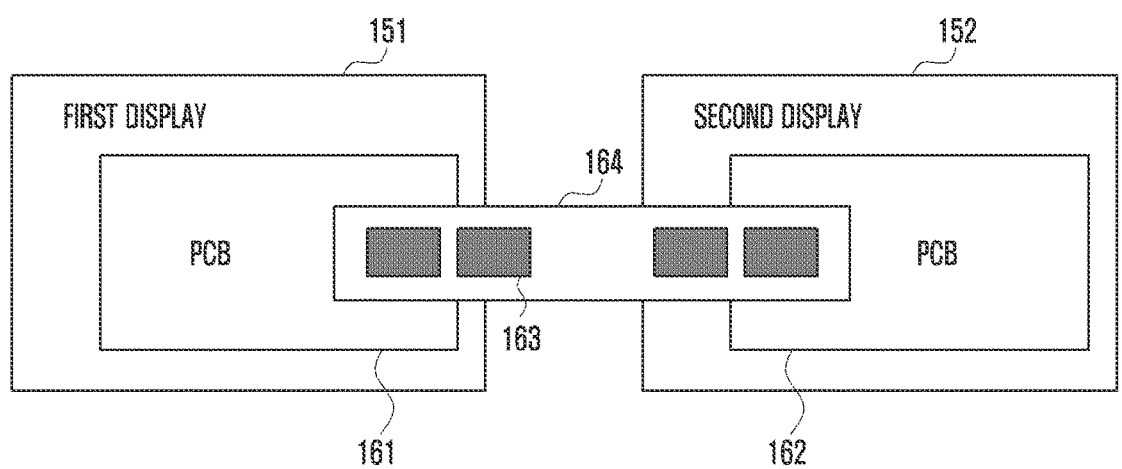
FIG. 1C illustrates a connection structure between first and second displays of the electronic device according to various embodiments of the present disclosure.

FIG. 1C illustrates a connection structure between the first and second displays 151 and 152 of the electronic device according to various embodiments of the present disclosure.

Referring to FIG. 1C, the first and second displays 151 and 152 may be connected to each other through a Flexible Printed Circuit Board (FPCB) 164 that is formed of at least one of, for example, plastic and shape memory alloy. According to an embodiment, in cases where the first and second displays 151 and 152 are connected to each other in a non-contact (e.g., wireless) manner, the FPCB 164 may include a wireless communication module 163 for communication between the first and second displays 151 and 152. The FPCB 164 may be connected to the first or second display 151 or 152 through, for example, a PCB connector. According to an embodiment, the FPCB 164 may be connected to a first PCB 161 placed on the first display 151 and a second PCB 162 placed on the second display 152. The first or second PCB 161 or 162 may be connected to the FPCB 164, for example, in a detachable manner. According to an embodiment, an electronic device may include a plurality of displays including at least first and second displays and a display control module functionally connected to the plurality of displays. The display control module may display a first input region corresponding to a first language or symbol set and a second input region corresponding to a second language or symbol set through the first and second displays.

According to an embodiment, the display control module may receive input corresponding to an electronic pen, a sound, or a gesture through at least one of the first and second input regions.

According to an embodiment, the display control module may change a language or symbol set corresponding to a second one of the first and second input regions based on at least a part of information displayed through a first one of the first and second input regions.

According to an embodiment, the display control module may activate at least one of the first and second displays based on input for at least one of the first and second input regions.

According to an embodiment, the display control module may identify national information displayed on the corresponding display among the first and second displays and change a language or symbol set corresponding to the first or second input region based on the national information.

According to an embodiment, the display control module may display a third input region corresponding to a third language or symbol set through at least one of the plurality of displays.

According to an embodiment, the display control module may acquire input or situation information for the electronic device and move at least one of the first and second input regions from a first one to a second one of the first and second displays based on the input.

According to an embodiment, the display control module may acquire an activation state of the corresponding display among the first and second displays as the situation information.

According to an embodiment, the display control module may select at least one of the first and second displays based on information on a sensor functionally connected to the electronic device and display at least one of the first and second input regions through the at least one display.

Figure 2A:
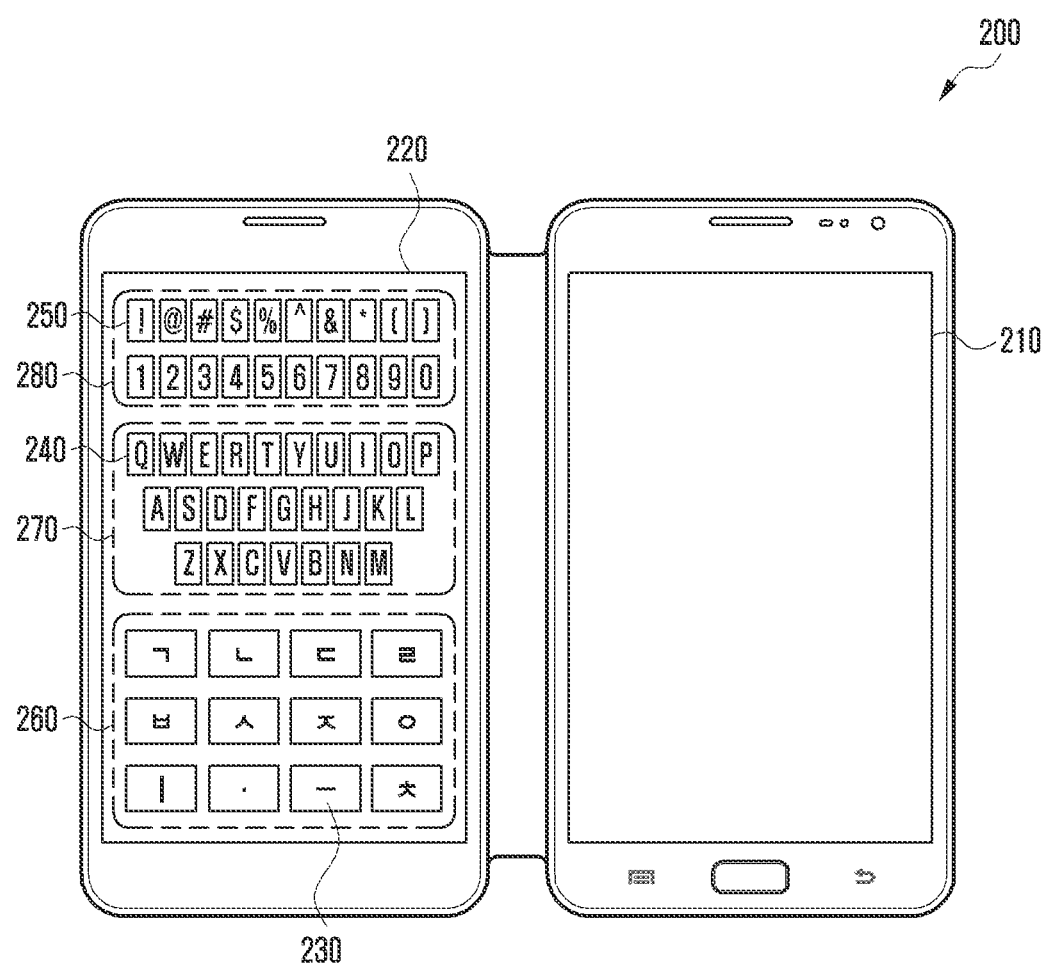
FIGS. 2A, 2B, 2C, and 2D illustrates examples of displaying an input region through a plurality of displays in an electronic device according to various embodiments of the present disclosure.

FIG. 2A illustrates an example of displaying a plurality of input regions through at least one of multiple displays in an electronic device 200 according to various embodiments of the present disclosure.

Referring to FIG. 2A, the electronic device 200 (e.g., the electronic device 101) may display, for example, a plurality of keypads 230, 240, and 250 through at least one (e.g., a second display 220) of multiple displays functionally connected thereto. For example, the plurality of keypads 230, 240, and 250 may correspond to a first language or symbol set (e.g., Hangeul), a second language or symbol set (e.g., Alphabet), and a third language or symbol set (e.g., a combination of numbers and special characters), respectively. The plurality of keypads 230, 240, and 250 may be displayed, for example, in first to third input regions 260, 270, and 280, respectively, which are partial regions of the corresponding display (e.g., the second display 220).

According to an embodiment, information on the first language may be displayed through one of the first and second displays 210 and 220 (for example, the first display 210), and information on the second language may be displayed through the other of the first and second displays 210 and 220 (for example, the second display 220). For example, the first language (e.g., Hangeul) of FIG. 2A may be displayed through the first input region 260 of the first display 210.

According to an embodiment, the first language or symbol set (e.g., Hangeul) may be displayed, for example, through the keypad 230 for the first language and may be input through the first input region 260 where the keypad 230 for the first language is displayed. For example, the second language or symbol set (e.g., Alphabet) may be displayed through the keypad 240 for the second language and may be input through the second input region 270 where the keypad 240 for the second language is displayed. For example, the third language or symbol set (e.g., a combination of numbers and special characters) may be displayed through the keypad 250 for the third language and may be input through the third input region 280 where the keypad 250 for the third language is displayed.

The first to third symbol sets may be a combination of characters, numbers, and symbols. According to various embodiments, the first and second symbol sets may correspond to mutually different languages (e.g., Korean and English) or may be combinations of different characters, numbers, and symbols of the same language (e.g., Hiragana and Katakana, Hangeul consonants and vowels, or English upper-case and lower-case letters).

The first to third input regions 260, 270, and 280 may be, for example, regions where keypads for inputting the first to third languages are displayed, respectively. For example, the size of each keypad may be equal to or smaller than that of the input region where the corresponding keypad is displayed. The electronic device may acquire a user input (e.g., a touch, hovering, an electronic pen input, a gesture, or a sound) through the input regions, and according to an embodiment, a particular key of the displayed keypad is selected by the user input, whereby a character, number, or symbol corresponding to the particular key of the language or symbol set (e.g., the first language or symbol set or the second language or symbol set) relevant to the displayed keypad may be input.

The electronic device may receive, for example, a sound as at least a part of a user input, and the sound may include a person's voice or an acoustic sound or music from an object or a machine. According to an embodiment, a sensor capable of receiving the sound may be located in an input region of the electronic device. According to another embodiment, a sensor capable of receiving the sound may be located in another input region of the electronic device, and through the corresponding input region among the plurality of input regions, the electronic device may provide (e.g., display, sound, vibrate, or highlight) an indication (e.g., information such as an image, a photo, or text) for notifying a user that the sensor recognizes (acquires) the sound.

According to an embodiment, the first, second, and third input regions 260, 270, and 280 may be simultaneously displayed through at least one (e.g., the second display 220) of the multiple displays. For example, while the first to third input regions 260, 270, and 280 are being displayed simultaneously through the second display 220, the electronic device 200 may execute a different application through the first display 210 or display a screen different from that displayed through the second display 220. The first to third input regions 260, 270, and 280 do not have to be simultaneously displayed and may be displayed sequentially or at different time points. Alternatively, one of them may be omitted, or another input region may be additionally displayed.

Figure 2B:
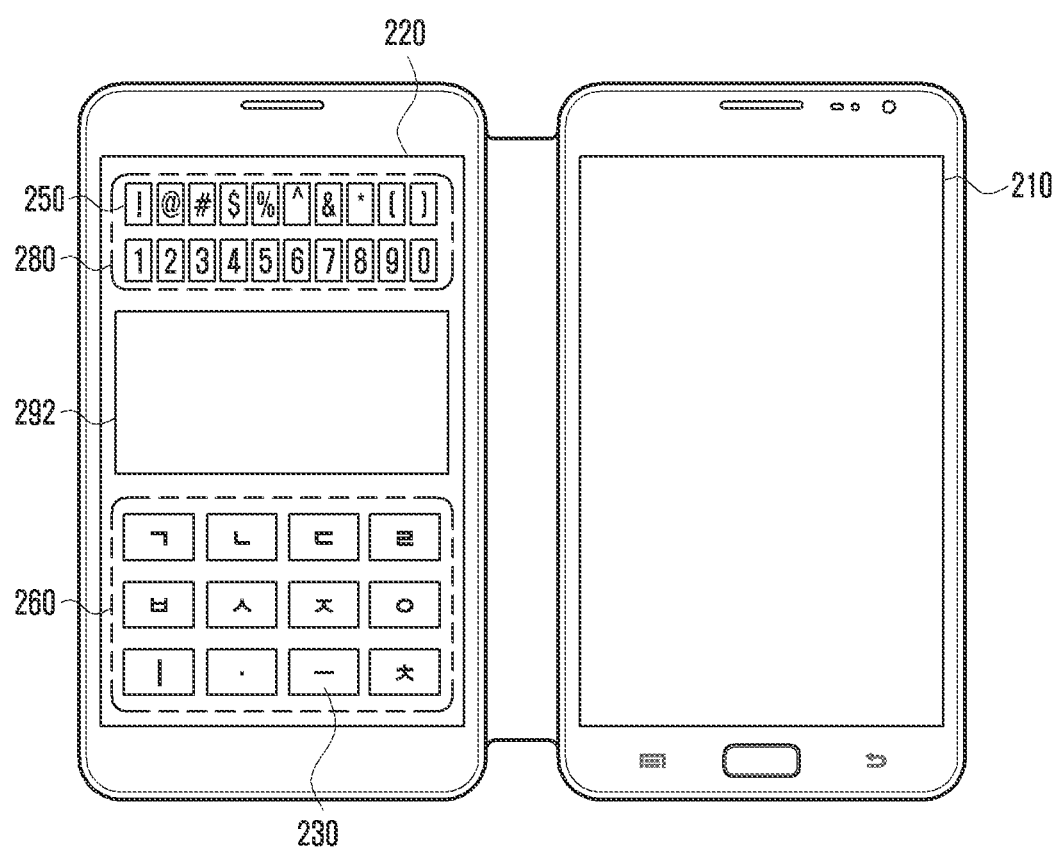

FIG. 2B illustrates an example of displaying an input region for an electronic pen in the electronic device according to various embodiment of the present disclosure.

Referring to FIG. 2B, the electronic device (e.g., the electronic device 101) may display an electronic pen input region 292, which can receive input through an electronic pen, together with at least one of the first to third input regions 260, 270, and 280 through at least one of the first and second displays 210 and 220. The electronic pen input may be received through the electronic pen input region 292, and input information corresponding to the electronic pen input may be displayed through at least one of the first and second displays 210 and 220.

According to an embodiment, the electronic device may activate the electronic pen input region 292 based on the determination that a user uses the electronic pen. For example, when the user extracts the electronic pen inserted into the electronic device in order to use the electronic device, the electronic device may determine such a situation through a sensor (e.g., a Hall sensor, a detection sensor, or a magnetic sensor) and display the electronic pen input region 292.

Figure 2C:
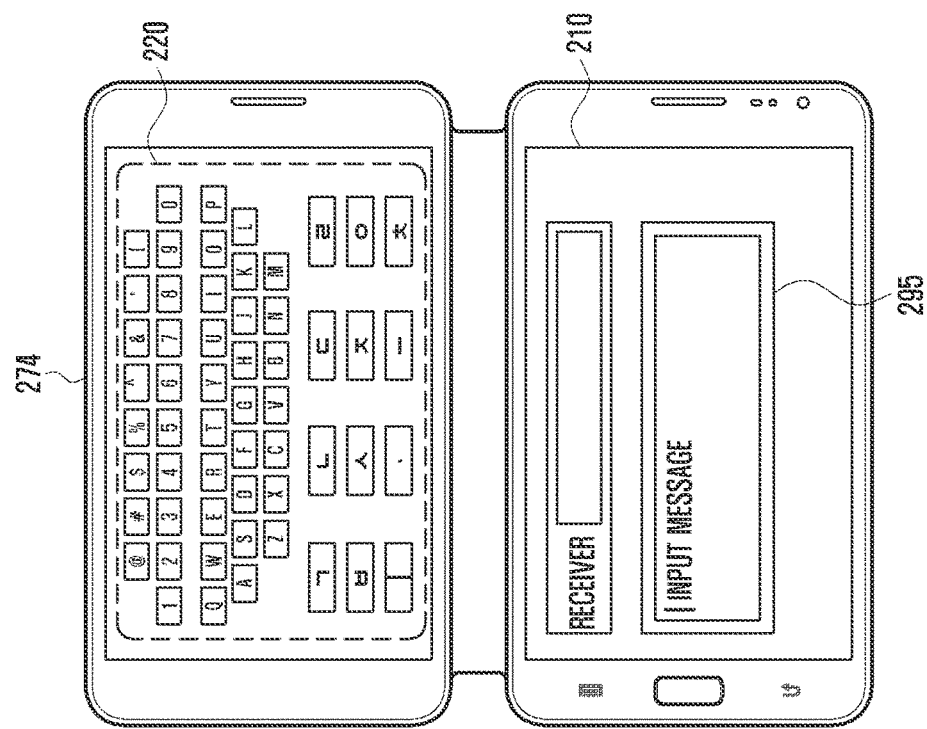
Figure 2C:
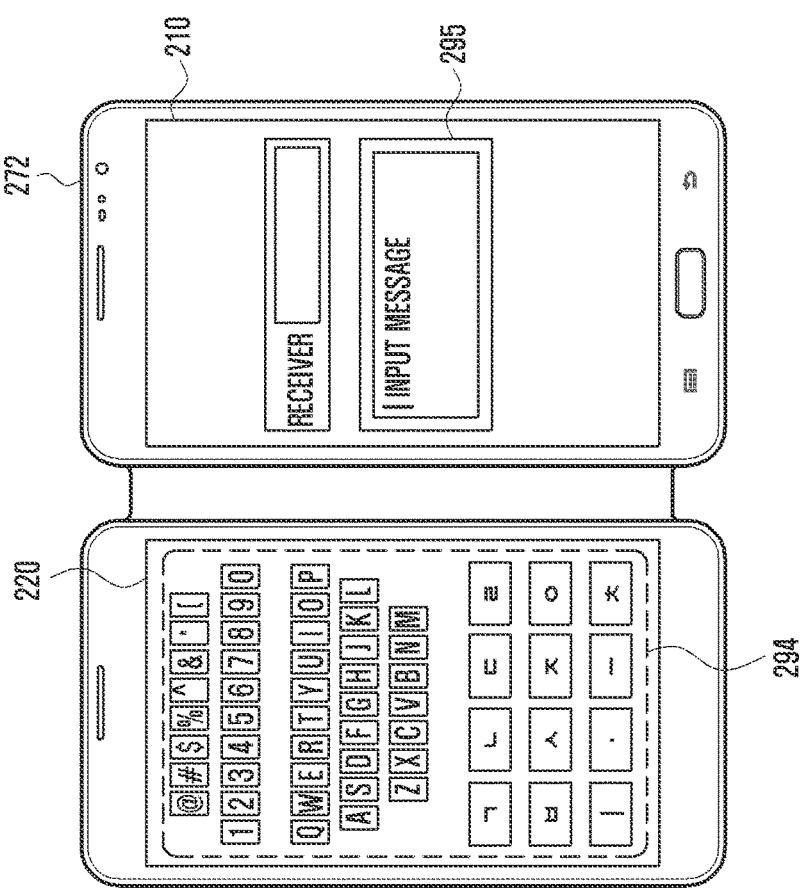

FIG. 2C illustrates an example of displaying a plurality of input regions in a landscape or portrait mode in the electronic device according to various embodiment of the present disclosure.

Referring to FIG. 2C, the display mode of the electronic device (e.g., the electronic device 101) may be changed from a landscape mode 272 to a portrait mode 274. For example, the electronic device may display an input region 294 through the second display 220 and an input window 295 through the first display 210 in the landscape mode 272.

According to an embodiment, the electronic device may determine the display mode thereof as one of the landscape mode 272 and the portrait mode 274 based on information (e.g., rotation information, motion information, location information, or acceleration information of the electronic device) detected by a sensor (e.g., a six-axis sensor, an acceleration sensor, a gravity sensor, or terrestrial magnetism sensor) functionally connected thereto.

According to an embodiment, in cases where the second display 220 of the electronic device is located above the first display 210 and the first display 210 is located below the second display 220, the display mode of the electronic device may be changed from the landscape mode 272 to the portrait mode 274. The input region 294 displayed on the second display 220 in the landscape mode 272 may be displayed on the first display 210 when the display mode is changed to the portrait mode 274. In addition, the input window 295 displayed on the first display 210 in the landscape mode 272 may be displayed on the second display 220 when the display mode is changed to the portrait mode 274.

Figure 2D:
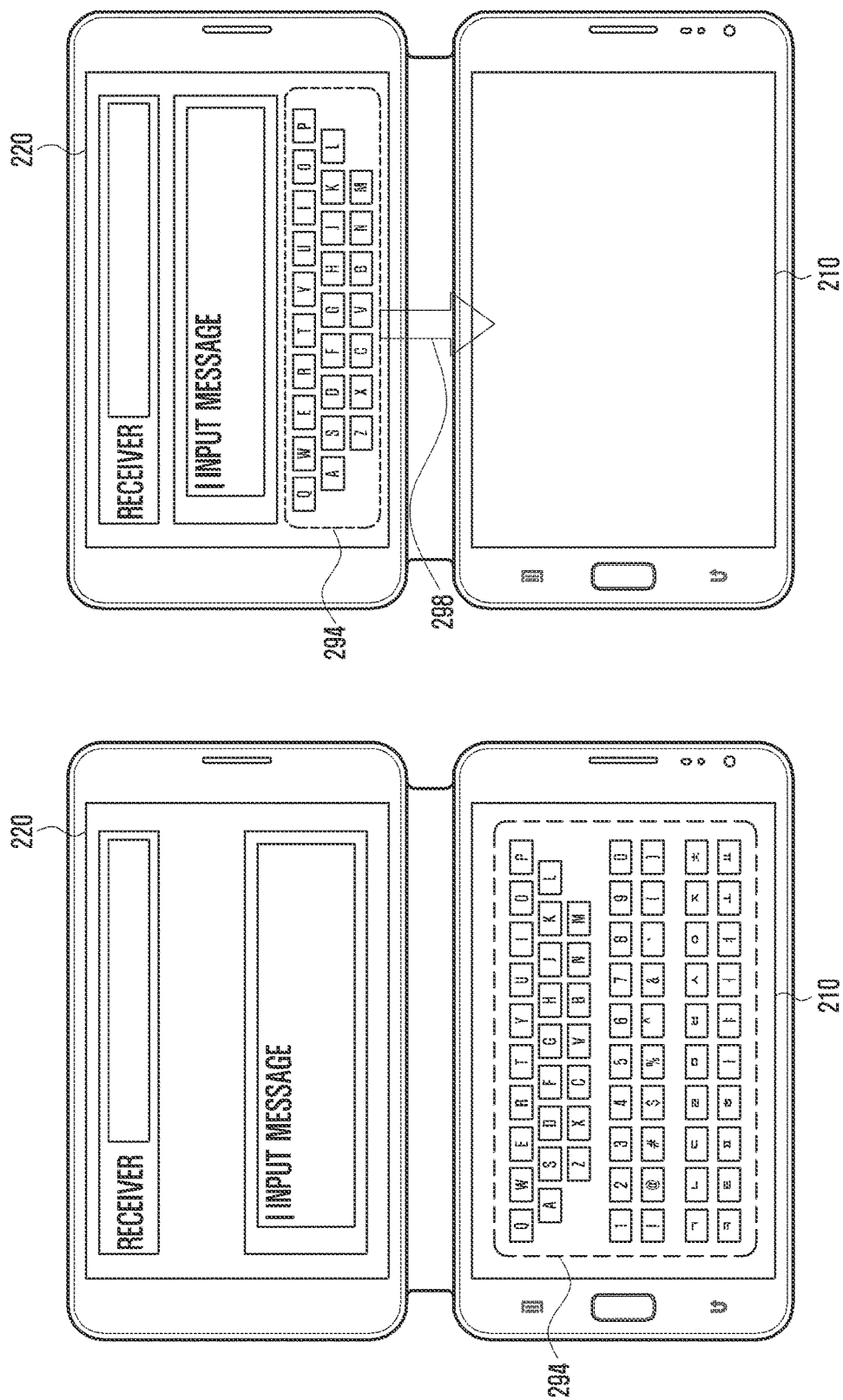

Referring to FIG. 2D, when the electronic device detects a user's particular gesture 298 (e.g., a drag or swipe input in a particular direction), the electronic device may move the input region 294 displayed on the second display 220 to the first display 210 and display it on the first display 210 based on the detected gesture.

According to various embodiments, the electronic device may move at least a part of an input region from a display to another display and display it on the other display based on automatic input by a system (e.g., information such as situation recognition, a type of application, a user's use pattern (e.g., left or right handed), and the like) as well as a user's particular input such as a particular gesture.

Figure 3A:
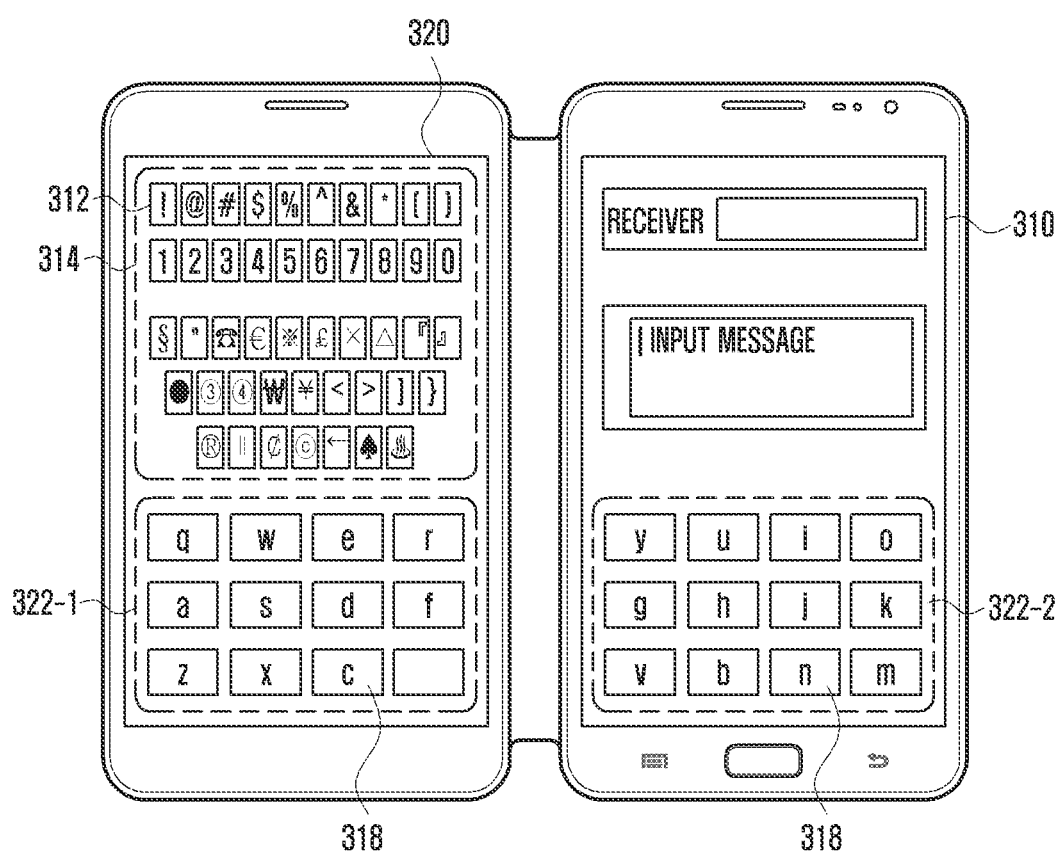
FIGS. 3A, 3B, 3C, 3D, and 3E illustrates examples of displaying one or more input regions through a plurality of displays in an electronic device according to various embodiments of the present disclosure.

FIG. 3A illustrates an example of simultaneously displaying a plurality of input regions at least temporarily through multiple displays in an electronic device according to various embodiments of the present disclosure.

Referring to FIG. 3A, the electronic device (e.g., the electronic device 101) may display a first input region 322, where a first language 318 (e.g., Alphabet or Hangeul) may be input, through multiple displays (e.g., first and second displays 310 and 320) functionally connected thereto. The first input region 322 may be composed of a first and second parts 322-1 and 322-2. According to an embodiment, the electronic device may display a second input region 312, where a second language 314 (e.g., numbers or special characters) may be input, through the multiple displays (e.g., the first and second displays 310 and 320).

According to an embodiment, the input region (e.g., the first or second input region 322 or 312) may be displayed in parts through the first and second displays 310 and 320 based on setting information of the electronic device (e.g., a setting to divide and display the input region). For example, when a user sets an option such that the first input region is displayed in parts, the first input region 322 may be displayed in multiple parts on the first and second displays 310 and 320. In one example, the first language 318 may be input to first and second parts 322-1 and 322-2 of the first input region. The first part 322-1 of the first input region may be displayed on at least a portion of the second display 320, and the second part 322-2 of the first input region may be displayed on at least a portion of the first display 310 at the same time.

According to an embodiment, the second input region 312 where the second language 314 may be input and the first input region 322 where the first language 318 may be input may be simultaneously displayed at least temporarily through at least one of the first and second displays 310 and 320.

Figure 3B:
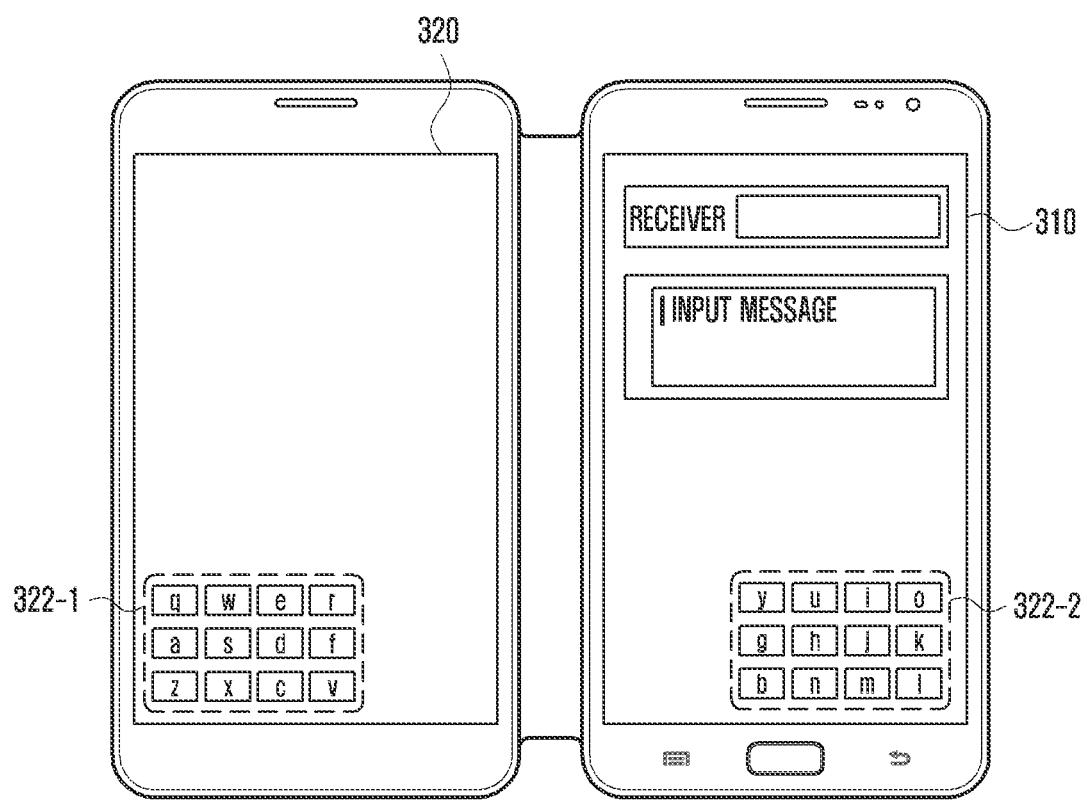

FIG. 3B illustrates an example of adjusting and displaying an input region based on situation information in an electronic device according to various embodiment of the present disclosure.

According to an embodiment, adjusting and displaying an input region may include reducing, magnifying, moving, rotating, or dividing and then displaying the input region.

According to an embodiment, in cases where an input region for displaying a keypad is magnified or reduced and then displayed, keys constituting the keypad may be magnified or reduced in size or the number of keys displayed in the input region may be increased or decreased.

According to an embodiment, the electronic device (e.g., the electronic device 101) may determine the reduction or magnification of the input region based on, for example, situation information related thereto (e.g., a user's setting, the user's grip position, and acceleration information, location information, or photography information of the electronic device). For example, in cases where the user sets an option such that the input region is magnified or reduced in response to a particular situation (e.g., a situation in which an input mode using one finger is set), the electronic device may reduce or magnify and then display the input region when detecting an event corresponding to the particular situation. According to an embodiment, when the user executes a particular application (e.g., a video player), the electronic device may reduce or magnify the input region to a predetermined size in relation to the particular application and then display it.

Referring to FIG. 3B, based on the determination to reduce or magnify the input region, the electronic device (e.g., the electronic device 101) may reduce or magnify the first and second parts 322-1 and 322-2 of the input region and then display them through the first and second displays 310 and 320. For example, in cases where the user sets the input region to a reduction or magnification mode, the first and second parts 322-1 and 322-2 of the input region may be reduced or magnified and then displayed on a lower left side of the second display 320 and on a lower right side of the first display 310, respectively.

Figure 3C:
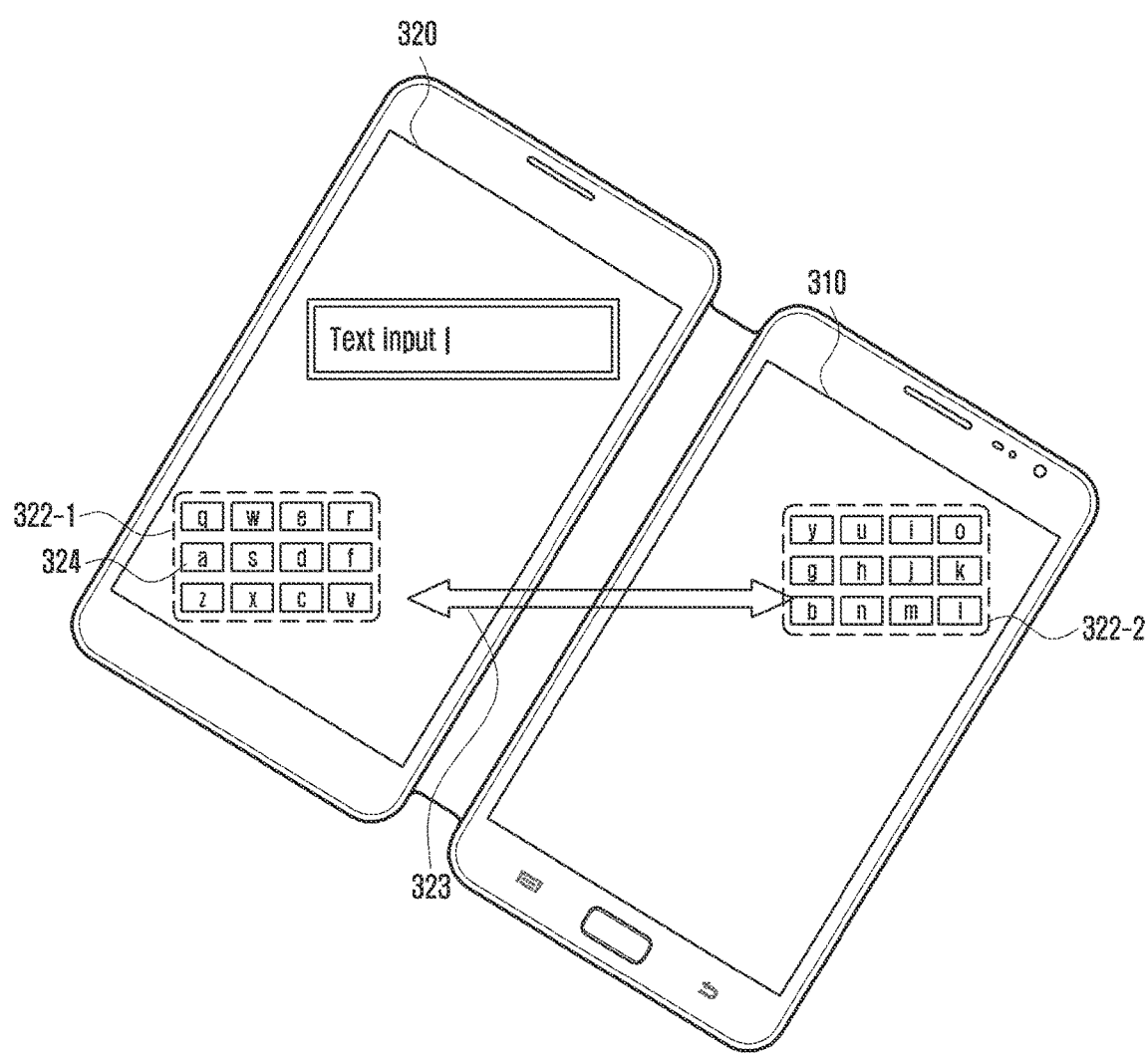

FIG. 3C illustrates an example of tilting and displaying input regions through multiple displays in an electronic device according to various embodiments of the present disclosure.

Referring to FIG. 3C, the electronic device (e.g., the electronic device 101) may acquire information related to a degree by which the electronic device is tilted, through a sensor functionally connected thereto (e.g., a six-axis sensor, an acceleration sensor, an orientation sensor, an infrared sensor, a camera sensor, a location sensor, or a tilt sensor). The electronic device may tilt and display the input region 322 through the first or second display 310 or 320 based on the acquired information. According to an embodiment, the tilt angle of the input region 322 may be set to be the same as or similar to that of the electronic device. According to an embodiment, through the first and second displays 310 and 320, the electronic device may tilt the first part 322-1 of the input region at a predetermined angle to display the tilted first part on at least a portion of the second display 320 and may tilt the second part 322-2 of the input region at a predetermined angle to display the tilted second part on at least a portion of the first display 310. According to an embodiment, the tilt angles of the first and second parts 322-1 and 322-2 of the input region may be set to be the same as or different from each other.

According to an embodiment, the electronic device may adjust the tilt angle of the input region based on at least one of a user's sight-line information, grip position information, and the electronic device's tilt information so that the user can make an input while maintaining a horizontal state. According to an embodiment, the electronic device may obliquely display the input region 322 on the first and second displays 310 and 320 to adjust a distance 323 between the divided input regions 322-1 and 322-2 to a distance by which the user can conveniently make an input.

Figure 3D:
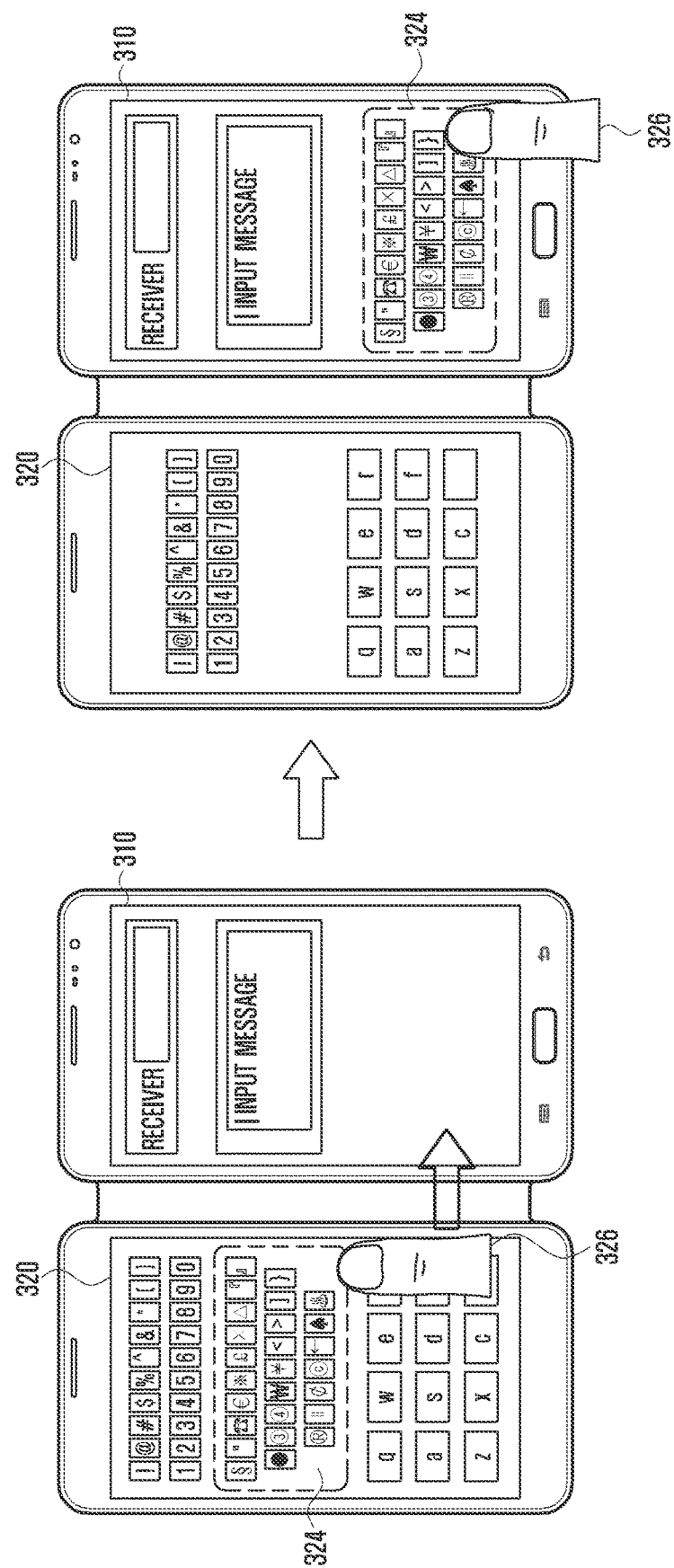

FIG. 3D illustrates an example of moving an input region between multiple displays in an electronic device according to various embodiments of the present disclosure.

Referring to FIG. 3D, the electronic device (e.g., the electronic device 101) may recognize a user's gesture (e.g., a touch, hovering, or an electronic pen input) based on a sensor (e.g., a touch sensor, an acceleration sensor, a tilt sensor, a camera sensor, or a location sensor) functionally connected to the electronic device (e.g., the electronic device 101). For example, in cases where the user inputs a gesture 326 from the left to the right through the second display 320, the electronic device may recognize the corresponding gesture through a sensor (e.g., a camera sensor or a touch sensor) and move the location of an input region 324 to display it in response to the recognized gesture.

According to an embodiment, based on the user's gesture 326 (e.g., a touch, hovering, or an electronic pen input), the electronic device may move the input region 324, displayed on the second display 320, from the second display 320 to the first display 310 to display it on the first display 310. For example, in cases where the input of the user's gesture 326 (e.g., a touch, hovering, or an electronic pen input) is detected on the first display 310 while the user's gesture 326 (e.g., a touch, hovering, or an electronic pen input) is detected on the second display 320 and the input region 324 is selected, the electronic device may determine that the user's gesture 326 corresponds to an instruction to move the input region 324 from the second display 320 to the first display 310 and based on the determination, may move the input region 324 from the second display 320 to the first display 310.

According to an embodiment, in cases where the input region 324 is moved from the second display 320 to the first display 310, the input region 324 may be displayed in a region of the first display 310 where an object, an application, or an interface is not displayed or may be displayed while being overlapped with the object, the application, or the interface. When the region where the object, the application, or the interface is not displayed is relatively small in size, the object, the application, or the interface, which is currently displayed on the first display 310, or the moved input region may be displayed while being magnified or reduced in size.

Figure 3E:
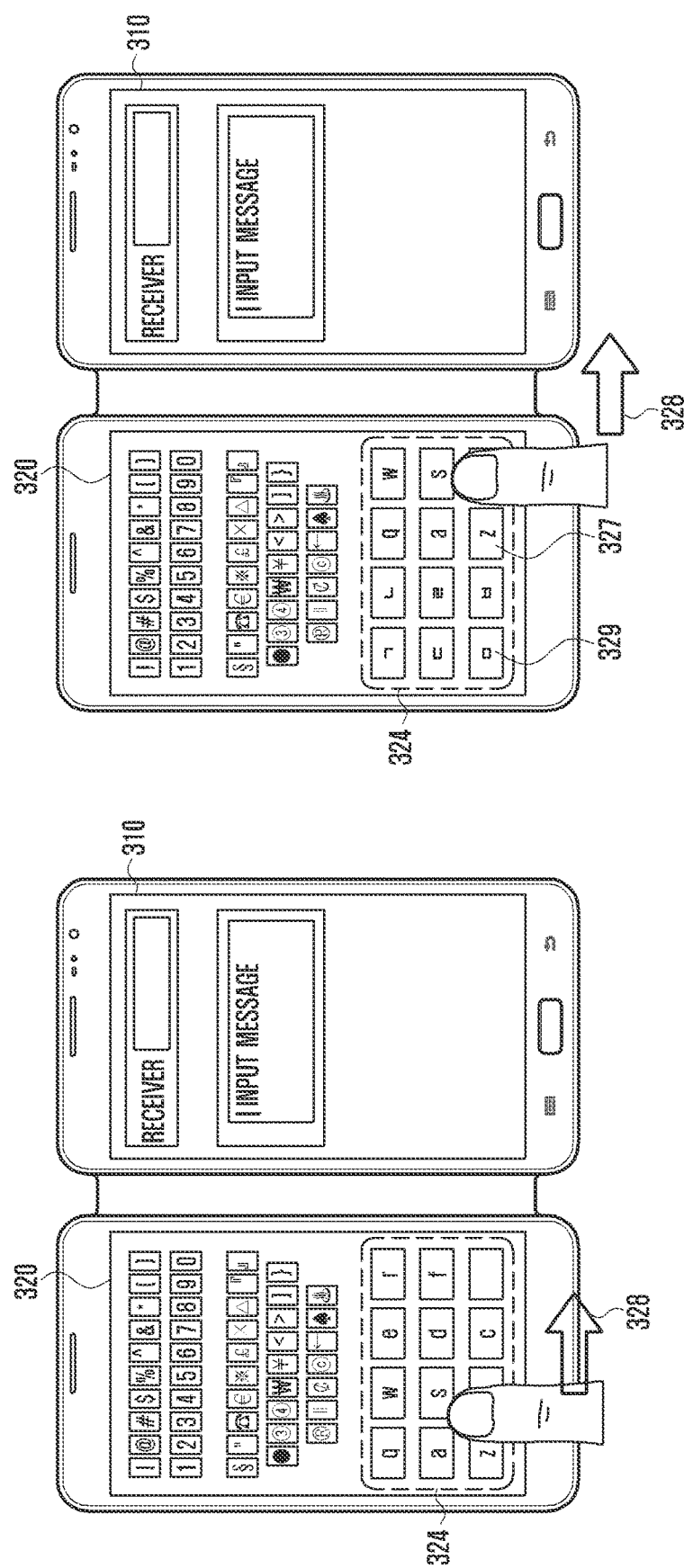

FIG. 3E illustrates an example of changing a language or symbol set displayed through an input region in an electronic device according to various embodiments of the present disclosure.

Referring to FIG. 3E, the electronic device (e.g., the electronic device) may detect a user input (e.g., a touch, hovering, an electronic pen input, a gesture, or a motion) using a sensor (e.g., a touch sensor, a camera sensor, an infrared sensor, an electromagnetic sensor, or a magnetic field sensor) functionally connected thereto. For example, when a first language 327 (e.g., Alphabet) is displayed on the second display 320, the user input (e.g., a touch, hovering, an electronic pen input, a gesture, or a motion) may be detected in an input region 324. In cases where the user input is moved in a predetermined direction 328, the language displayed in the input region 324 may be replaced by another language. For example, in cases where the user input is moved leftwards or rightwards in the input region 324, the first language 327 (e.g., Alphabet) displayed in the input region 324 may be replaced by a second language 329 (e.g., Hangeul).

According to an embodiment, the quantity of the first or second language 327 or 329 displayed in the input region 324, a switching speed, or a display speed may be determined based on at least one of a variation, a changing direction, or a changing speed of a user input. For example, in cases where the changing speed of the user input is detected to be relatively high, the switching from the first language 327 to the second language 329 may be performed relatively quickly.

Figure 4A:
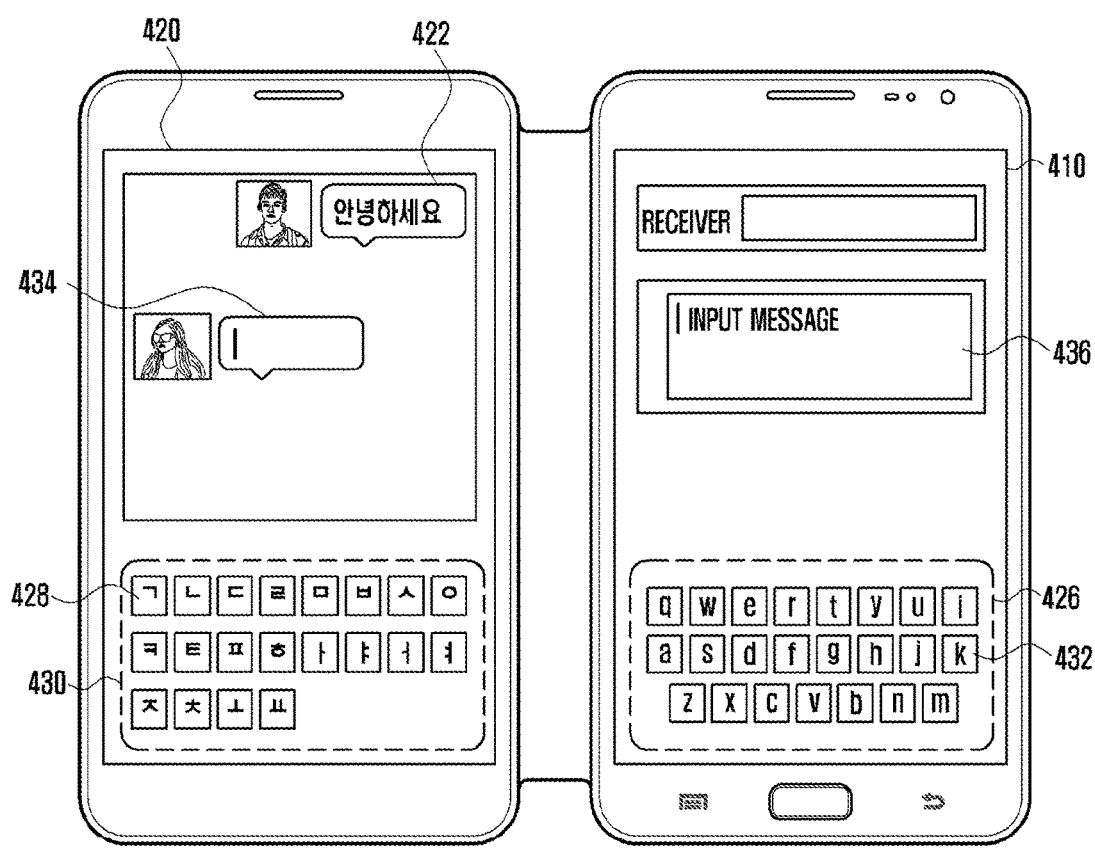
FIGS. 4A, 4B, 4C, 4D, 4E, 4F, 4G, 4H, 4I, and 4J illustrate examples of displaying contents input through at least one input region in an electronic device according to various embodiments of the present disclosure.

FIG. 4A illustrates an example of displaying contents, input through an input region, via at least one of multiple displays in an electronic device according to various embodiments of the present disclosure.

Referring to FIG. 4A, in cases where different programs are executed on first and second displays 410 and 420, the electronic device (e.g., the electronic device 101) may display first and second input regions 426 and 430 on the first and second displays 410 and 420, respectively. According to an embodiment, in cases where a messenger application (e.g., a social networking service) is executed through the second display 420, the electronic device may receive input of a second language 428 as at least a portion of a user input for the corresponding messenger application through the second input region 430. The input contents received through the second input region 430 may be displayed through a second input window 434 (e.g., a chat window, a password input window, or an address input window) of the messenger application. According to an embodiment, in cases where an e-mail application is executed through the first display 410, the electronic device may display, on the first display 410, the first input region 426 for transferring a user input to the corresponding e-mail application. A first language 432 may be displayed in the first input region 426. The input contents received through the first input region 426 may be displayed in a first input window 436 of the e-mail application.

As illustrated in FIG. 4A, the first and second input regions 426 and 430 may be displayed on the first and second displays 410 and 420, respectively, and contents input through the first and second input regions 426 and 430 may be accordingly displayed in the first and second input windows 436 and 434 which are located on the same displays as the respective input regions. The various embodiments of the present disclosure are not limited thereto, and contents input through the first and second input regions 426 and 430 may be displayed in the second and first input windows 434 and 436 which are located on the different displays from the respective input regions.

As illustrated in FIG. 4A, the first input region 426 may be displayed on the first display 410, and the second input region 430 may be displayed on the second display 420. The various embodiments of the present disclosure are not limited thereto, and the first and second input regions 426 and 430 may be simultaneously displayed at least temporarily on at least one of the first and second displays 410 and 420.

Figure 4B:
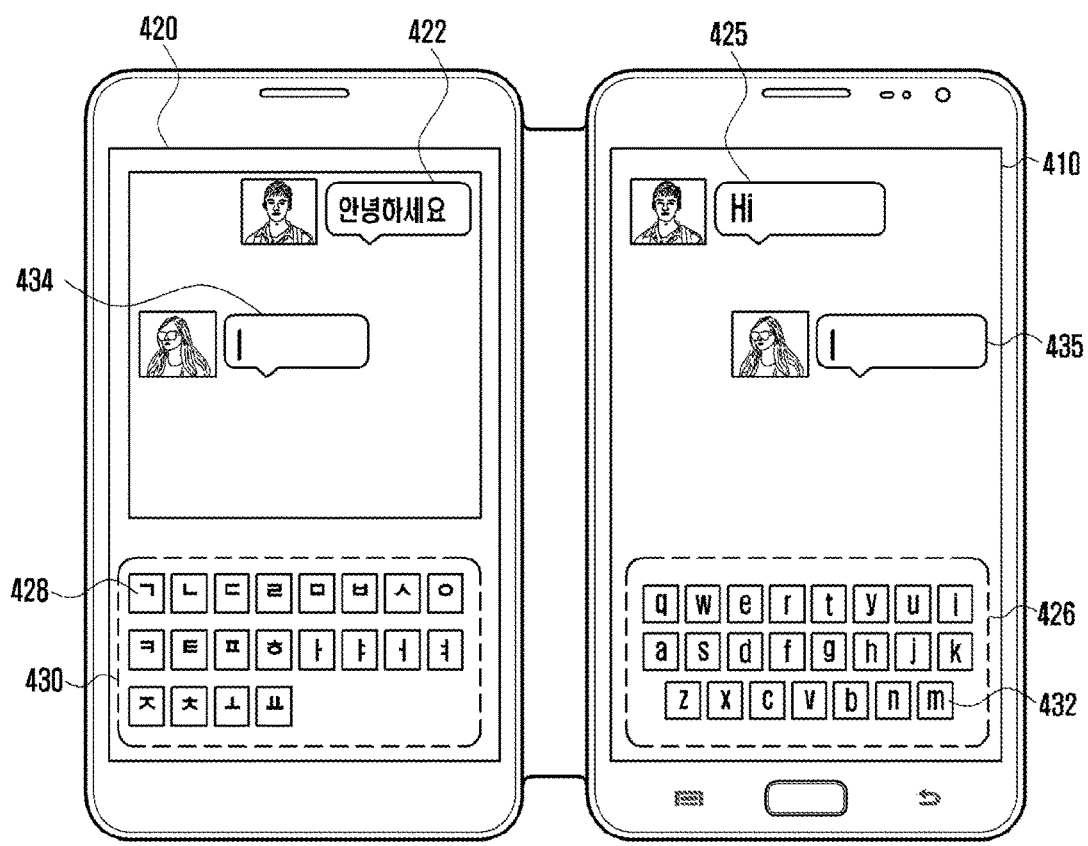

FIG. 4B illustrates an example of changing a language or symbol set in an input region based on information displayed on a display in an electronic device according to various embodiments of the present disclosure.

Referring to FIG. 4B, based on information displayed on at least one of the first and second displays 410 and 420, the electronic device (e.g., the electronic device 101) may determine a first language 432 that will be received through the first input region 426 or a second language 428 which will be received through the second input region 430.

According to an embodiment, in cases where at least a portion of information displayed on the display corresponds to the ASCII code, the electronic device may determine which language corresponds to the relevant information based on the ASCII code values. Values defined for respective languages are different from each other in the ASCII code, and on the basis of the values, the electronic device may accordingly determine which language (e.g., Hangeul, English, or Japanese) characters corresponding to the ASCII code correspond to. For example, in cases where the ASCII code of a character contained in the information is the number 65, the character corresponds to the English letter "A" and the information may be determined to be written in English.

According to an embodiment, in cases where the information includes characters of multiple languages, the electronic device may determine the languages corresponding to the respective characters based on the ASCII code values of the characters and set the language corresponding to the largest number of characters among the multiple languages as one of the first and second languages 432 and 428.

According to an embodiment, the electronic device may analyze a message 422 of an application displayed on the second display 420 and set Hangeul as the second language 428 which will be received through the second input region 430 when the language of the message 422 corresponds to Hangeul. In cases where a chat application is executed through the second display 420, the electronic device may analyze which language corresponds to messages frequently displayed in the chat application. When the frequently displayed message corresponds to Hangeul, the electronic device may set Hangeul as the second language 428 and display it through the second input region 430. Input contents received through the second input region may be displayed via the second input window 434 of the second display 420.

According to an embodiment, in cases where the language of a message 425 of an application that is being displayed through the first display 410 corresponds to English, the electronic device may set the Alphabet as the first language 432. Contents input in the first language 432 through the first input region 430 may be displayed through the first input window 435 of the first display 410.

Figure 4C:
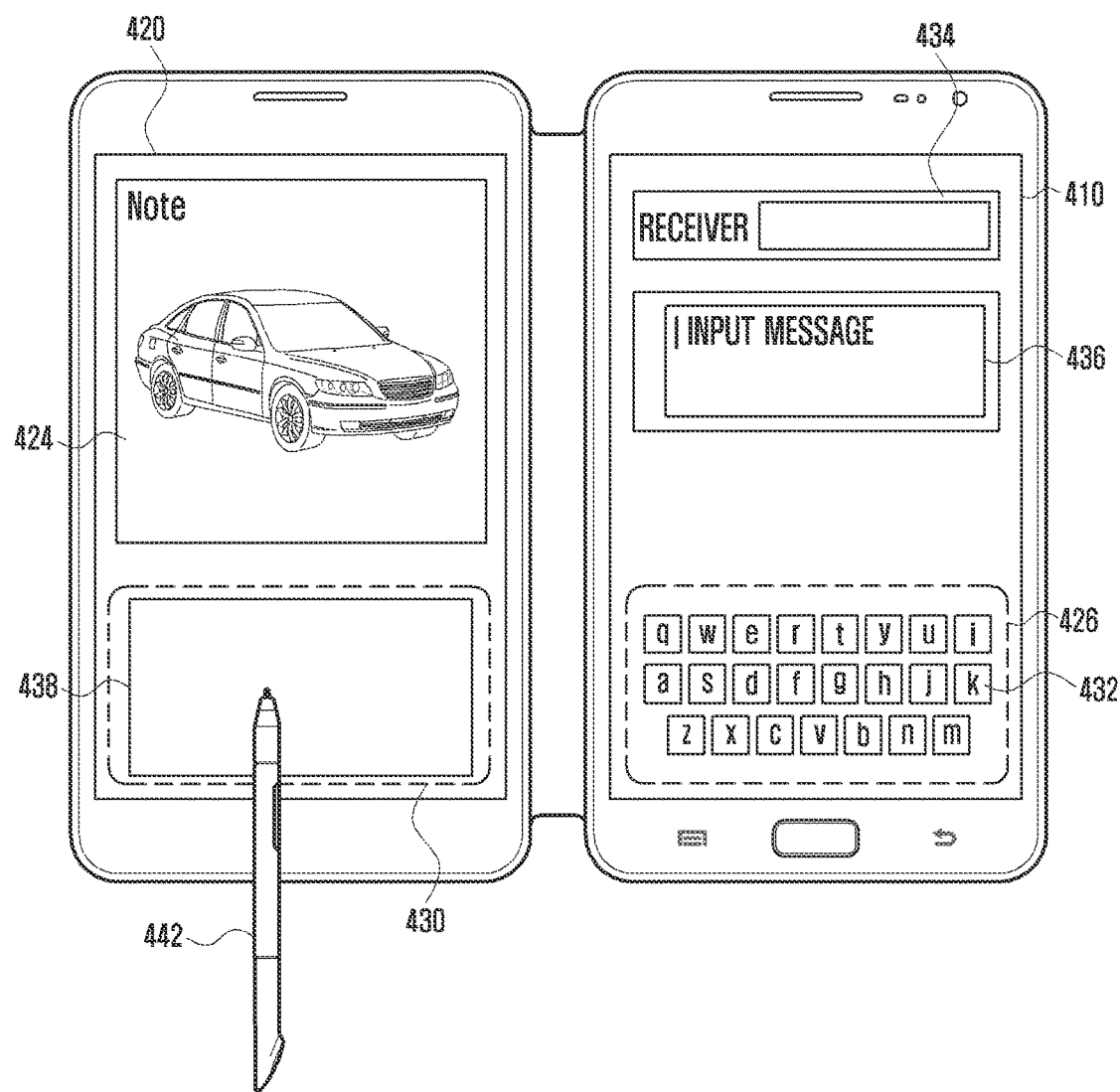

FIG. 4C illustrates an example of displaying an input region according to the type of an application that is being displayed on a display, according to various embodiments of the present disclosure.

Referring to FIG. 4C, when an application is being displayed on at least one of the first and second displays 410 and 420, an input region associated with the application may be displayed on at least one of the first and second displays 410 and 420. For example, when an application 424 through which a picture may be drawn is being displayed on the second display 420, an input region associated with the application 424 (e.g., an electronic pen input region 438 that can receive input through an electronic pen 442) may be displayed in the second region 430 of the second display 420.

According to an embodiment, the electronic device may acquire application ID values to determine the types of applications that are being displayed on the first and second displays 410 and 420. For example, the electronic device may acquire the application ID of the application 424 which is being displayed on the second display 420 and when it is determined that the corresponding application ID corresponds to an application through which a picture may be drawn, may display the electronic pen input region 438 where input can be made through the electronic pen 442. Values input through the electronic pen input region 438 may be displayed via the electronic pen related application 424 displayed on the second display 420 or may be interworked with the application.

Figure 4D:
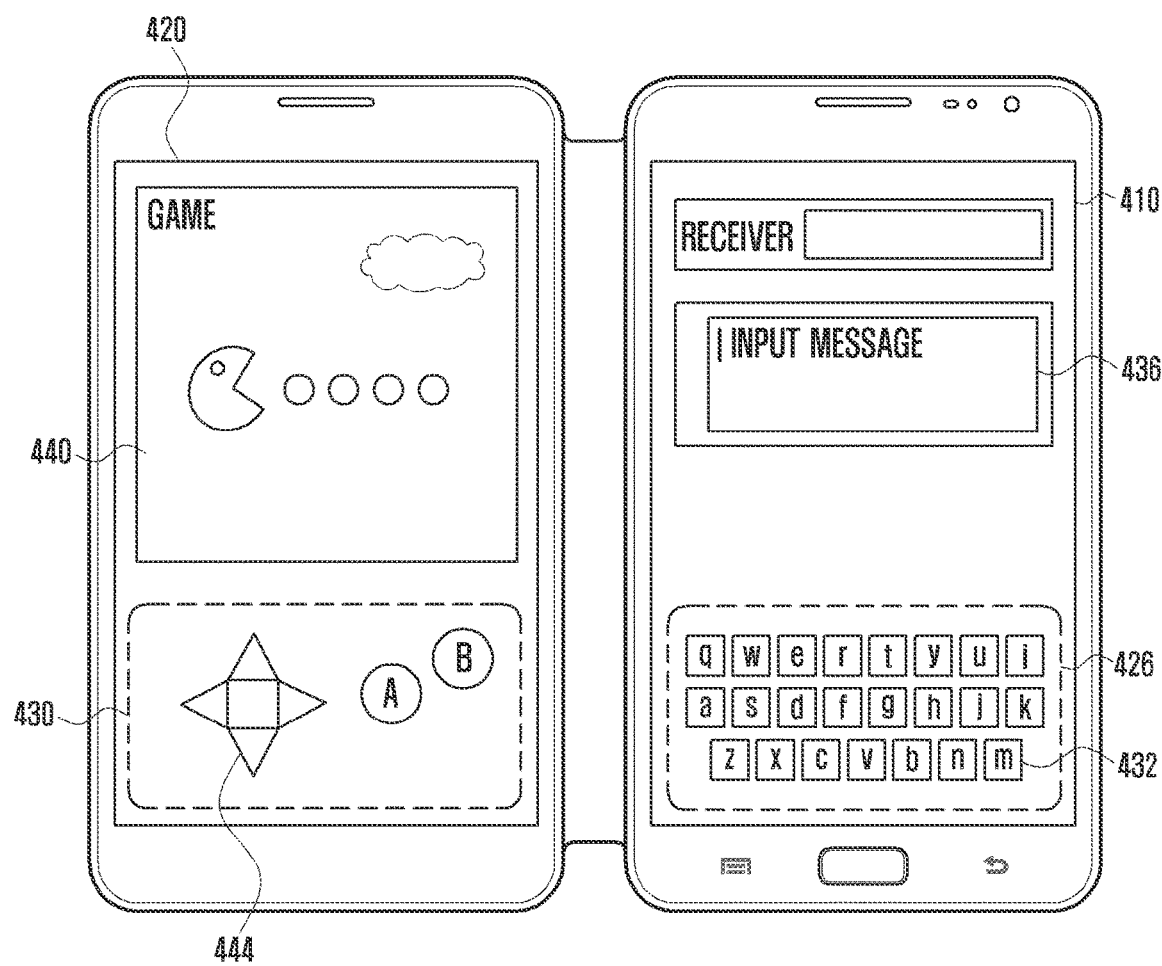

FIG. 4D illustrates an example of displaying an input region associated with a game application displayed on a display, according to various embodiments of the present disclosure.

Referring to FIG. 4D, when a game application 440 is executed on the second display 420, a symbol set 444 capable of receiving input values associated with the game application 440 may be displayed in the input region 430. For example, the symbol set 444 may include control symbols (e.g., up, down, left, and right direction keys) associated with the game application 440 or other game related control keys (e.g., button A and button B).

According to an embodiment, the electronic device may analyze an application ID of the game application 440 and identify key values associated with the corresponding application ID. Based on the key values, the electronic device may determine the symbol set 444 that has to be displayed in the input region.

According to an embodiment, operations corresponding to the symbol set 444 may be set for each application ID, and values input through the symbol set 444 may be transferred to the application whereby preset operations of the symbol set and the application may be performed. For example, values input through the symbol set 444 may not be transferred to applications that have no application ID matched with the symbol set 444 and may control only the application matched with the application ID.

Figure 4E:
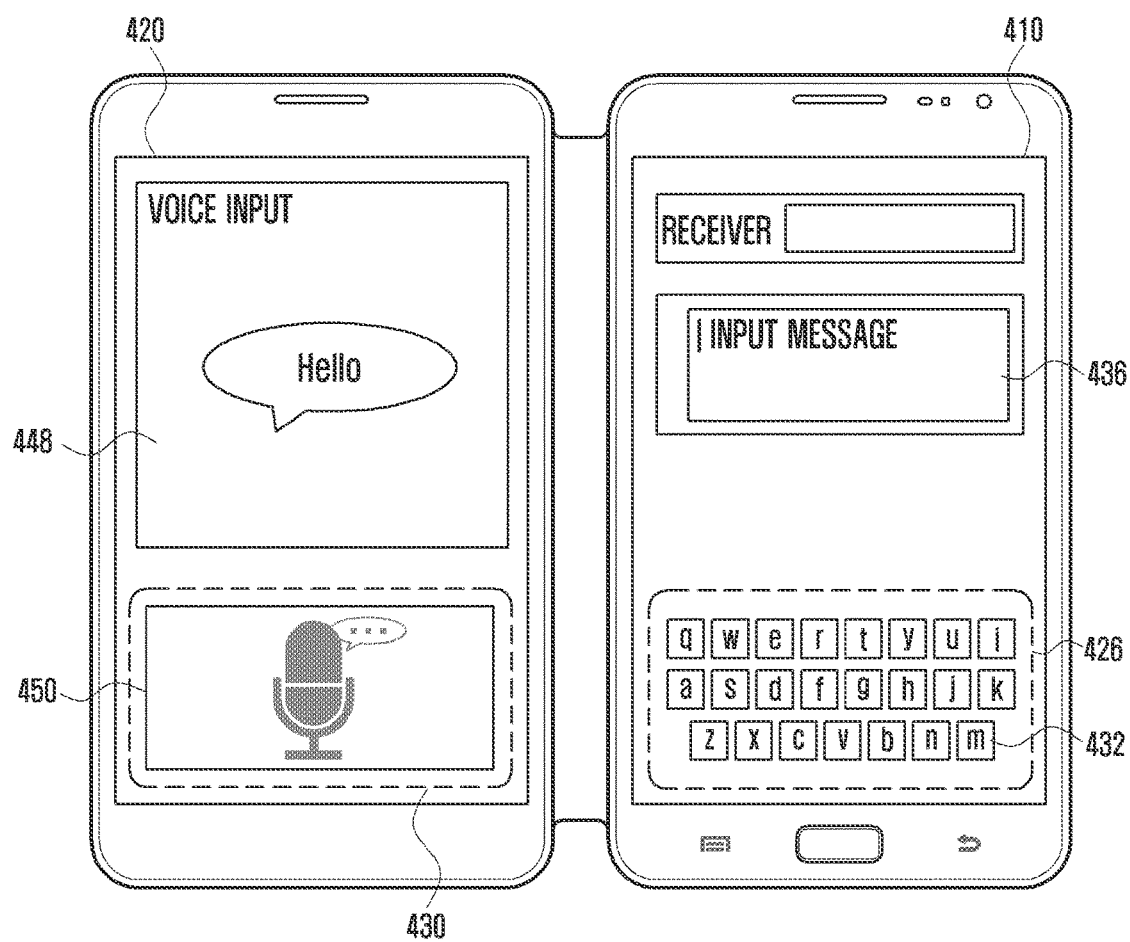

FIG. 4E illustrates an example of displaying an input region capable of receiving voice input on multiple displays in an electronic device according to various embodiments of the present disclosure.

Referring to FIG. 4E, the electronic device may display first and second input regions 426 and 430, which can receive voice input or sound input, through at least one of the first and second displays 410 and 420. For example, in cases where an application 448 that can receive sound input (e.g., a person's voice, an acoustic sound from an object or machine, or music) is displayed through the second display 420, a symbol set 450 that can receive input corresponding to the sound may be displayed in the second input region 430. The sound may be acquired through the second input region 430. For example, a voice recognition sensor (e.g., a microphone) may be embedded in the second input region 430. The sound received through the second input region 430 may be converted into text, and the converted text may be displayed through the application 448.

According to an embodiment, receiving the sound may mean that a sensor capable of receiving the sound is located in another region of the electronic device, and through the corresponding input region among the first and second input regions, the electronic device provides (e.g., displays, sounds, vibrates, or highlights) an indication (e.g., information such as an image, a photo, or text) for notifying a user that the sensor recognizes (acquires) the sound.

Figure 4F:
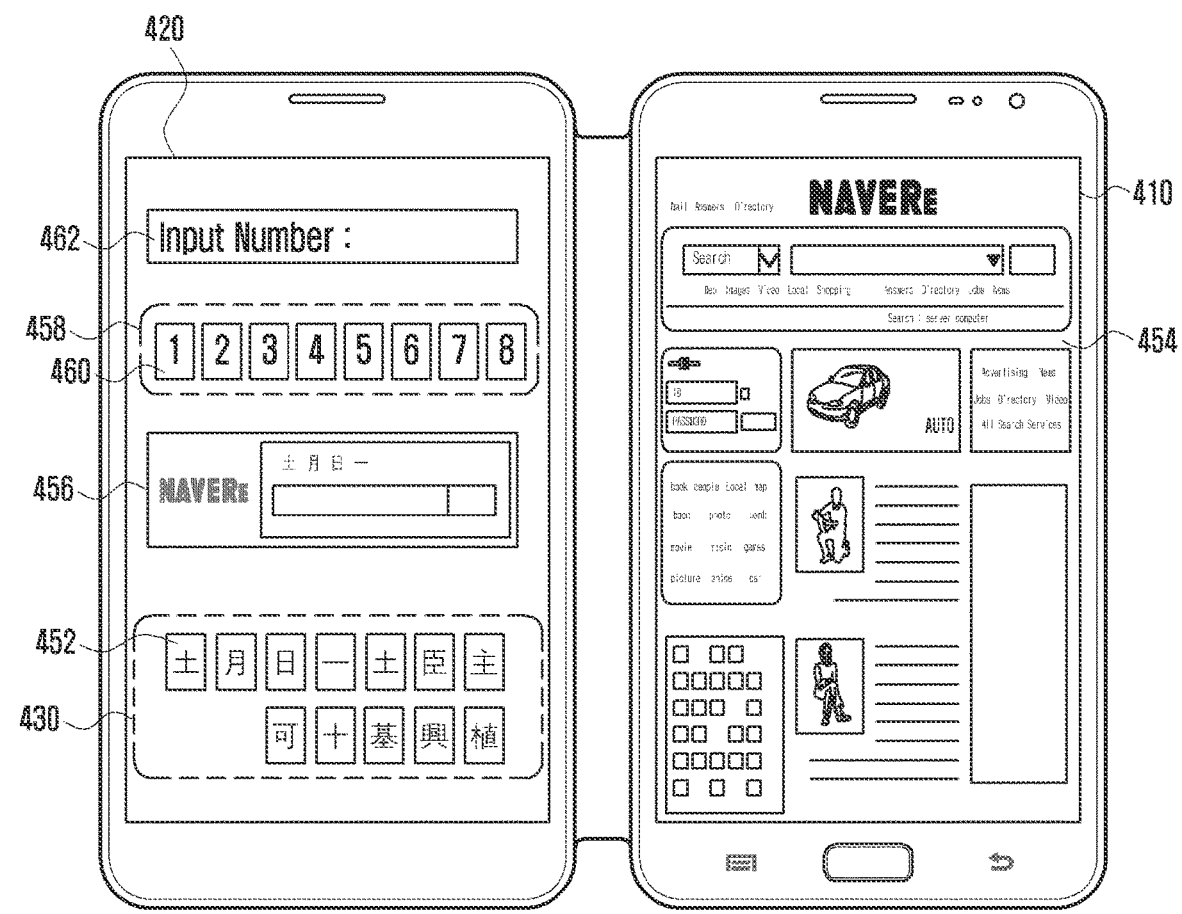

FIG. 4F illustrates an example of identifying characteristics of an input window and displaying an input region related thereto in an electronic device according to various embodiments of the present disclosure.

Referring to FIG. 4F, according to an embodiment, the electronic device may identify the type and characteristics of at least one input window (e.g., a chat window, a password input window, or an address input window) that is included in a web browser 454 displayed on the first display 410, and may display the corresponding input window on the second display 420. For example, in cases where the web browser 454 includes a number input window 462 through which numbers (e.g., date, birth day, calculator, card number, or phone number) may be input and a search term input window 456 through which a search term may be input, the electronic device may display the number input window 462 and the search term input window 456 through the second display 420. For example, in the case of the number input window 462, a first language 460 may be set as a number, and a first input region 458 including the first language 460 may be displayed at a location close to the number input window 462. In the case of the search term input window 456, a second language 452 may be set as a language (e.g., Chinese, Hangeul, or Alphabet) by which a search term may be input, and a second input region 430 including the second language 452 may be displayed at a location close to the search term input window 456.

Figure 4G:
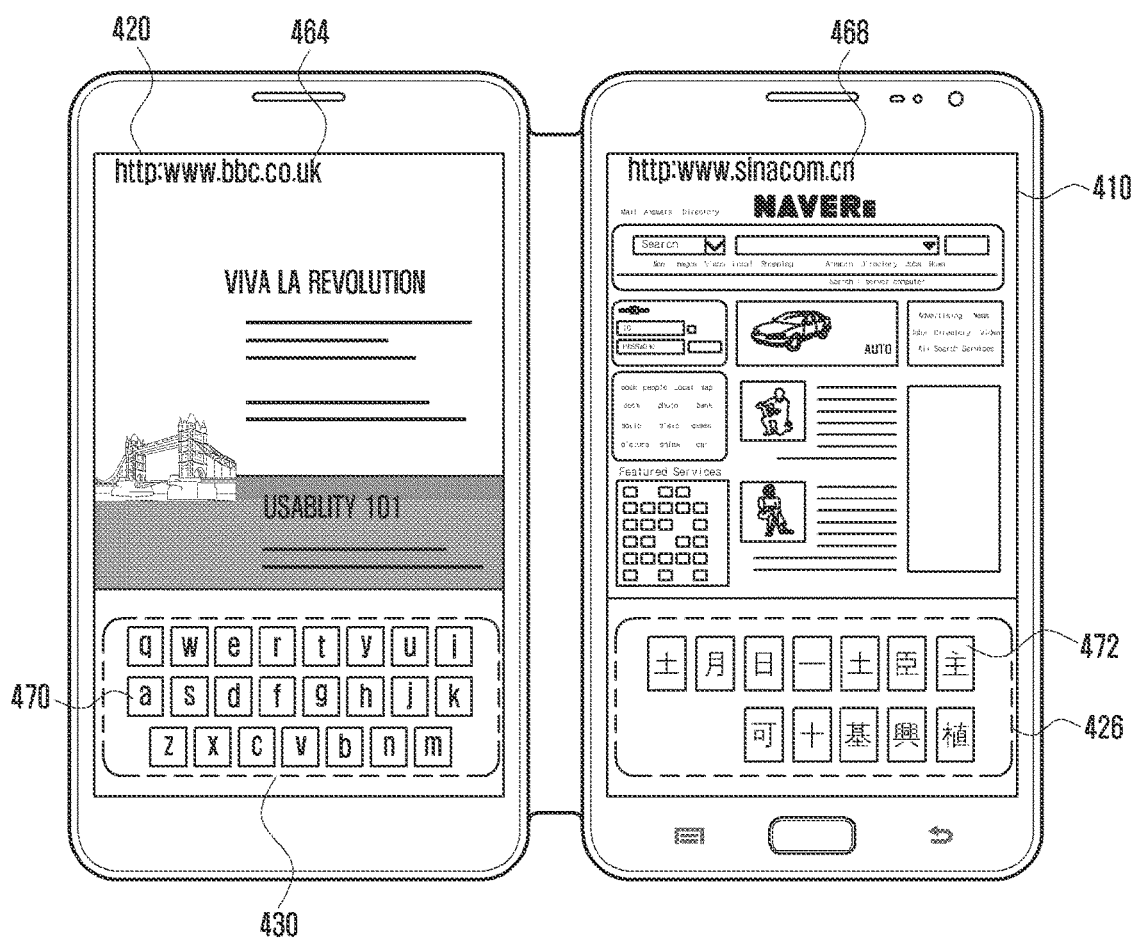

FIG. 4G illustrates an example of changing a language or symbol set corresponding to an input region based on national information displayed on a display in an electronic device according to various embodiments of the present disclosure.

Referring to FIG. 4G, based on national information displayed on at least one of the first and second displays 410 and 420, the electronic device may change a language or symbol set (e.g., a first language 472 or a second language 470) in an input region on the corresponding display. For example, when a web application is executed in the electronic device, Uniform Resource locators (URLs) 464 and 468 access particular sites. The URLs 464 and 468 may include information (e.g., a country code such as kr, us, or de) through which national information may be identified. The electronic device may extract national information of the particular sites from the URLs 464 and 468 of the web application and set languages mainly used in the corresponding countries as the first language 472 which may be received through a first input region 426 or the second language 470 which may be received through a second input region 430.

Figure 4H:
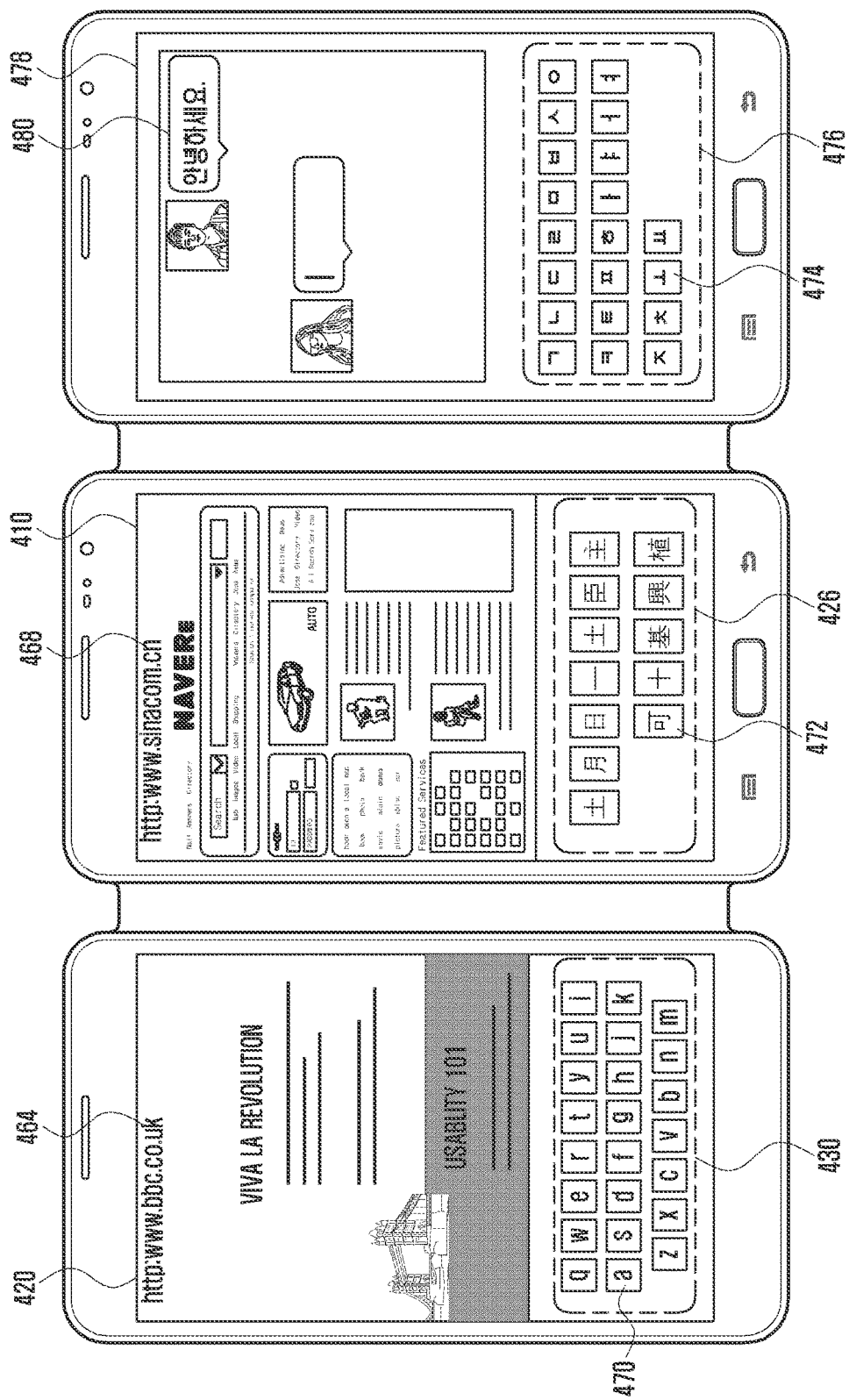

FIG. 4H illustrates an example of displaying various input regions through multiple (e.g., three or more) displays in an electronic device according to various embodiments of the present disclosure.

Referring to FIG. 4H, the electronic device may include first to third displays 410, 420, and 478. In FIG. 4H, the electronic device according to this embodiment is illustrated as including three displays. However, this is only an embodiment, and the number of displays which may be included in the electronic device according to this embodiment is not limited thereto. According to an embodiment, the respective displays may display different input regions.

According to an embodiment, in regard to the second display 420, the electronic device may set a second language 470 (e.g., English) based on second national information and receive the second language (e.g., English) through a second input region 430. In regard to the first display 410, the electronic device may set a first language 472 (e.g., Chinese) based on first national information 468 and receive the first language 472 (e.g., Chinese) through a first input region 426. In regard to the third display 478, the electronic device may analyze contents of text 480 displayed on the third display 478 to receive a third language 474 (e.g., Hangeul) through a third input region 476.

Figure 4I:
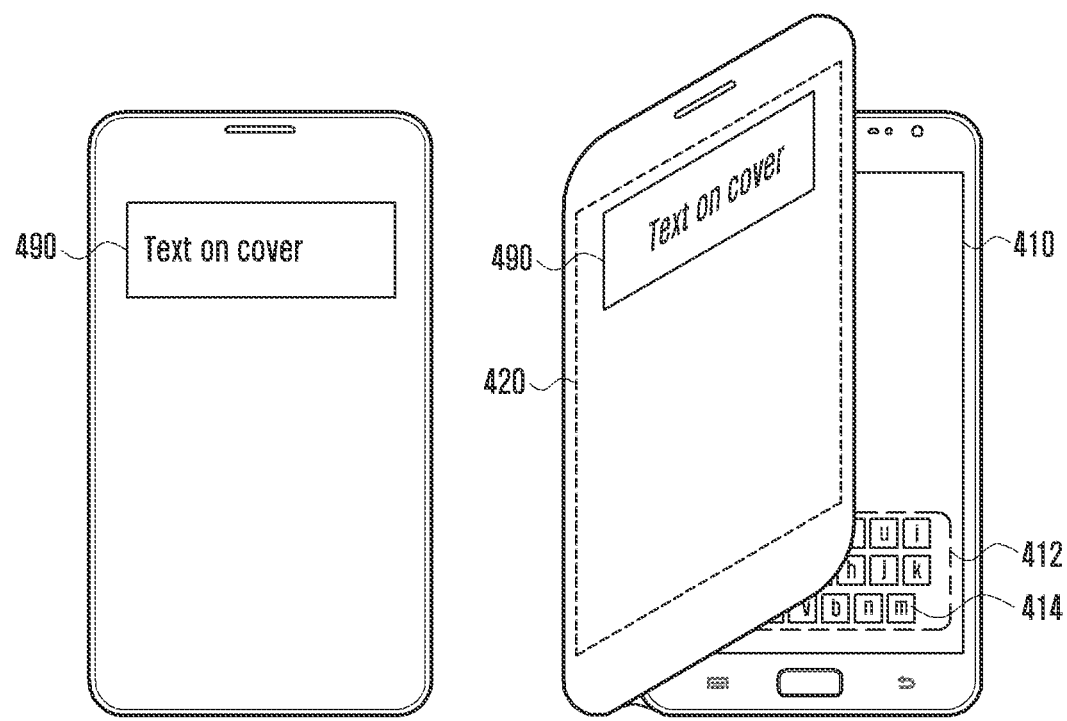

FIG. 4I illustrates an example of displaying input values through a display placed on a cover of an electronic device according to various embodiments of the present disclosure.

Referring to FIG. 4I, the electronic device (e.g., the electronic device 101) may display particular information using a cover display 490 functionally connected thereto. A language 414 input in an input region 412 of a main display 410 of the electronic device may be displayed through the cover display 490 of the electronic device. For example, when a user inputs text to the input region 412 of the main display 410, the input contents may be displayed through the cover display 490.

According to an embodiment, a relative distance between first and second displays 410 and 420 of the electronic device may be measured based on a sensor (e.g., a magnetic sensor, an infrared sensor, or a sound sensor) of the electronic device. The electronic device may change the contents displayed on the first or second display 410 or 420 based on the relative distance. For example, when the relative distance between the first and second displays 410 and 420 is smaller than a predetermined reference value, it may be determined that the first and second displays 410 and 420 overlap each other. In cases where the first and second displays 410 and 420 overlap each other, the contents displayed on the first display 410 may be displayed through the cover display 490.

According to an embodiment, in cases where the first display 410 is located on a main body of the electronic device and the second display 420 is located on the cover, the relative distance between the first and second displays 410 and 420 may be changed by opening/closing the cover for the electronic device. In addition, in cases where a first body part on which the first display 410 is located and a second body part on which the second display 420 is located are connected to each other through, for example, a folder, flip, slide, or hinge structure, the relative distance between the first and second displays may be changed by moving the first or second body part upward and downward or leftward and rightward.

According to an embodiment, a user input may be received through the cover display 490. For example, in cases where the user rotates the cover display 490 to place it on the rear surface of the first display 410, the electronic device may receive a user input through the cover display 490 to display the input value through the first or second display 410 or 420 or may control an object (e.g., an icon, a browser, a video, or music) displayed through the first or second display 410 or 420.

Figure 4J:
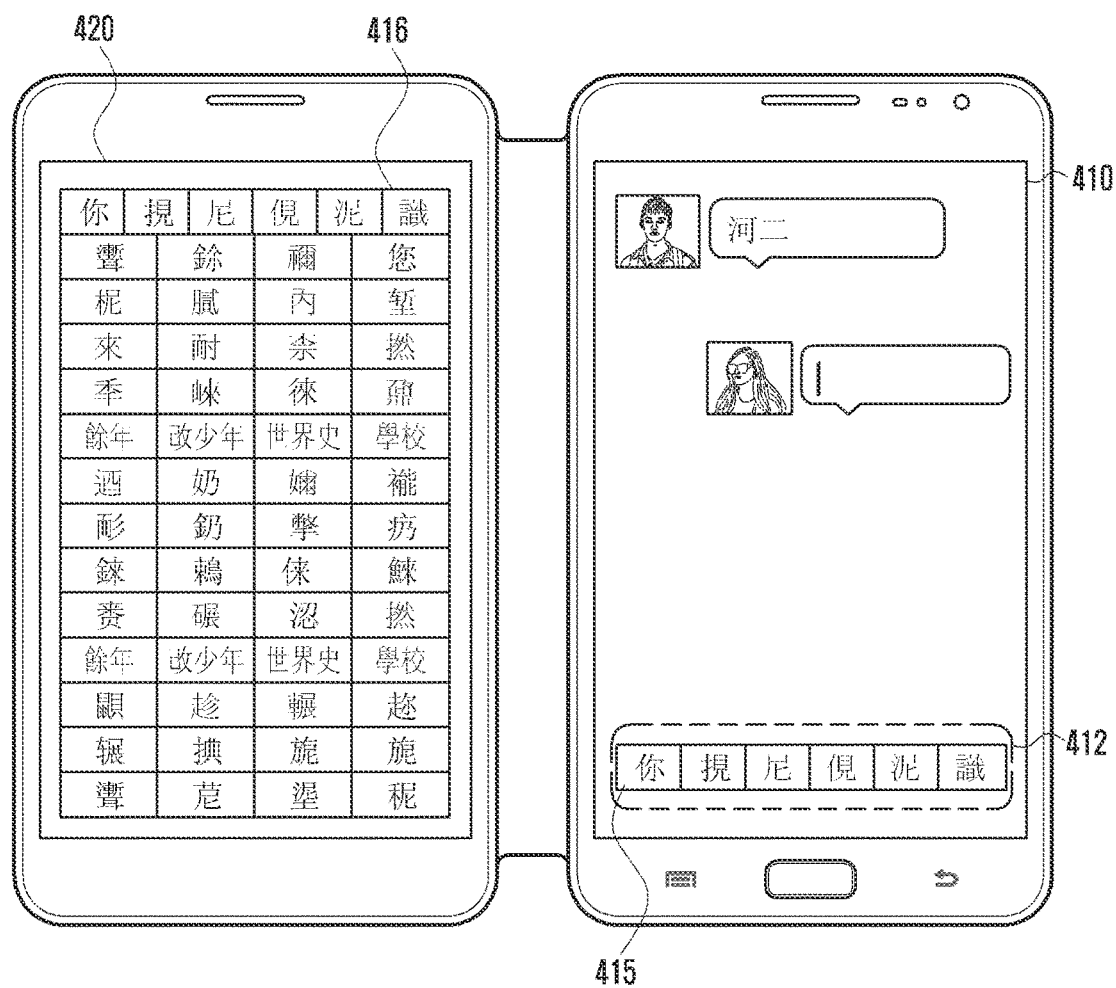

FIG. 4J illustrates an example of displaying a Chinese keypad through multiple displays in an electronic device according to various embodiments of the present disclosure.

Referring to FIG. 4J, when a first language 415 (e.g., an input means except for a keypad) is displayed through a first input region 412 of the first display 410 in the electronic device (e.g., the electronic device 101), the electronic device may display, through the second display 420, information 416 (e.g., pinyin or stroke) of Chinese characters which are Chinese characters or symbols associated with particular characters of the first language. According to an embodiment, in cases where one character of the first language 415 (e.g., Chinese) is selected through the first input region 412, the electronic device may analyze the selected character to display, through the second display 420, information associated with the selected character, for example, the information 416 on extended Chinese characters having the same radical, number of strokes, pinyin, or stroke as the selected character.

According to an embodiment, in cases where at least one character of the first language 415 in the first input region 412 on the first display 410 is selected, the electronic device may analyze characters associated with the corresponding character and display the associated characters in the second input region 416 on the second display 420. For example, the electronic device may display characters (e.g., homonyms, vowels, or consonants) associated with the character selected from the first input region 412.

Figure 5A:
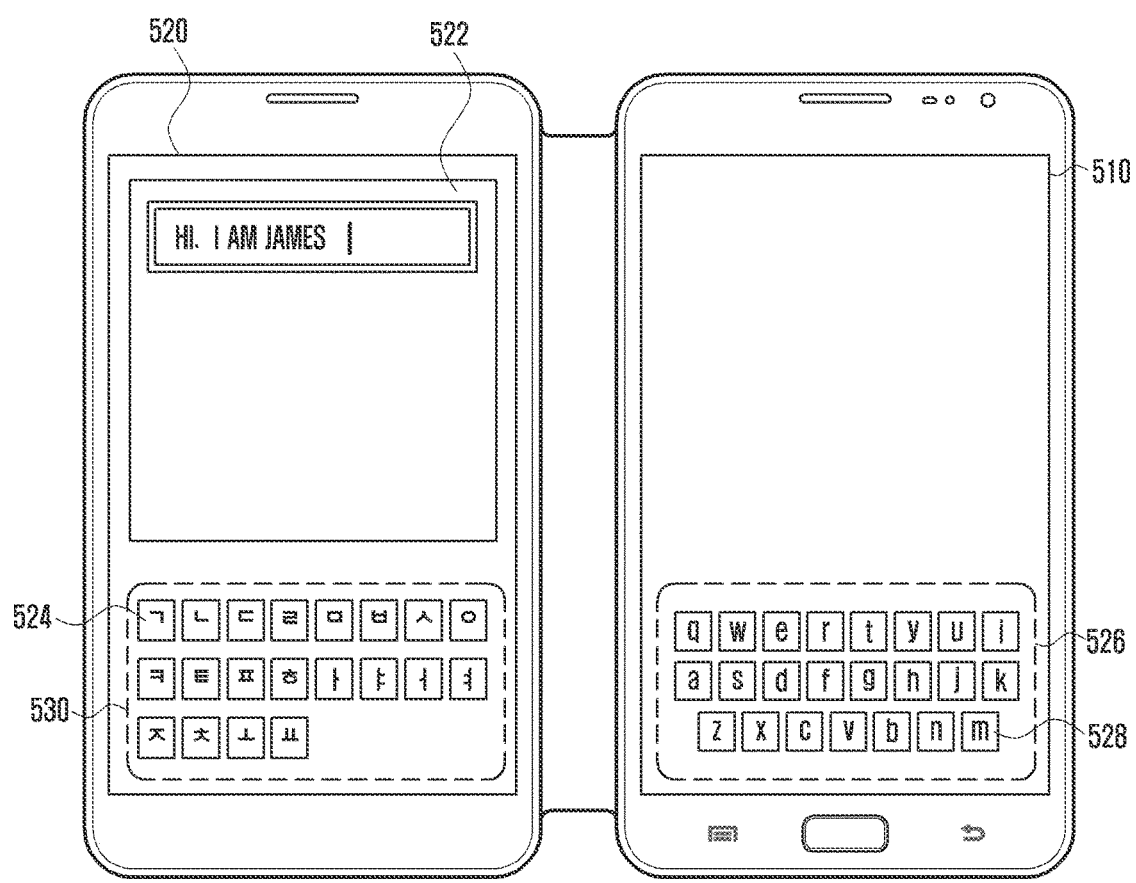
FIGS. 5A, 5B, 5C, and 5D illustrate examples of receiving input through at least one display in an electronic device according to various embodiments of the present disclosure.

FIG. 5A illustrates a screen for receiving input for one input window through multiple displays in an electronic device according to various embodiments of the present disclosure.

Referring to FIG. 5A, the electronic device (e.g., the electronic device 101) may include, for example, a first display 510 and a second display 520. For example, the electronic device may display an input window 522 (e.g., a text input window) on the second display 520 and provide first and second input regions 526 and 530 as an input means for the input window 522 to the first and second displays 510 and 520, respectively.

According to an embodiment, the first input region 526 may display a first language or symbol set in the form of a virtual keypad in which symbols pertaining to the first language or symbol set are mapped with a plurality of keys, in response to the first language or symbol set (e.g., an array 528 of English lower-case letters). According to an embodiment, the second input region 530 may display a second language or symbol set in the form of a virtual keypad in which symbols pertaining to the second language or symbol set are mapped with a plurality of keys, in response to the second language or symbol set (e.g., an array 524 of Hangeul consonants and vowels).

The electronic device may have a plurality of input regions with different languages or symbol sets placed on different displays to receive input using the multiple displays. Even when a user input includes various languages or symbol sets, the electronic device may allow a user to continue to input the languages or symbols without separate input for conversion of the language or symbol sets.

According to an embodiment, the electronic device may receive a user input for a key on the virtual keypads which are displayed through the first and second input regions 526 and 530 and display a symbol (e.g., a character, a number, or a sign) corresponding to the user input in the input window 522 displayed on the second display 520. The electronic device may display, to the user through the input window 522, the result that the user input has been received to allow the user to identify whether the user input has been input as intended, thereby guiding an accurate user input.

Figure 5B:
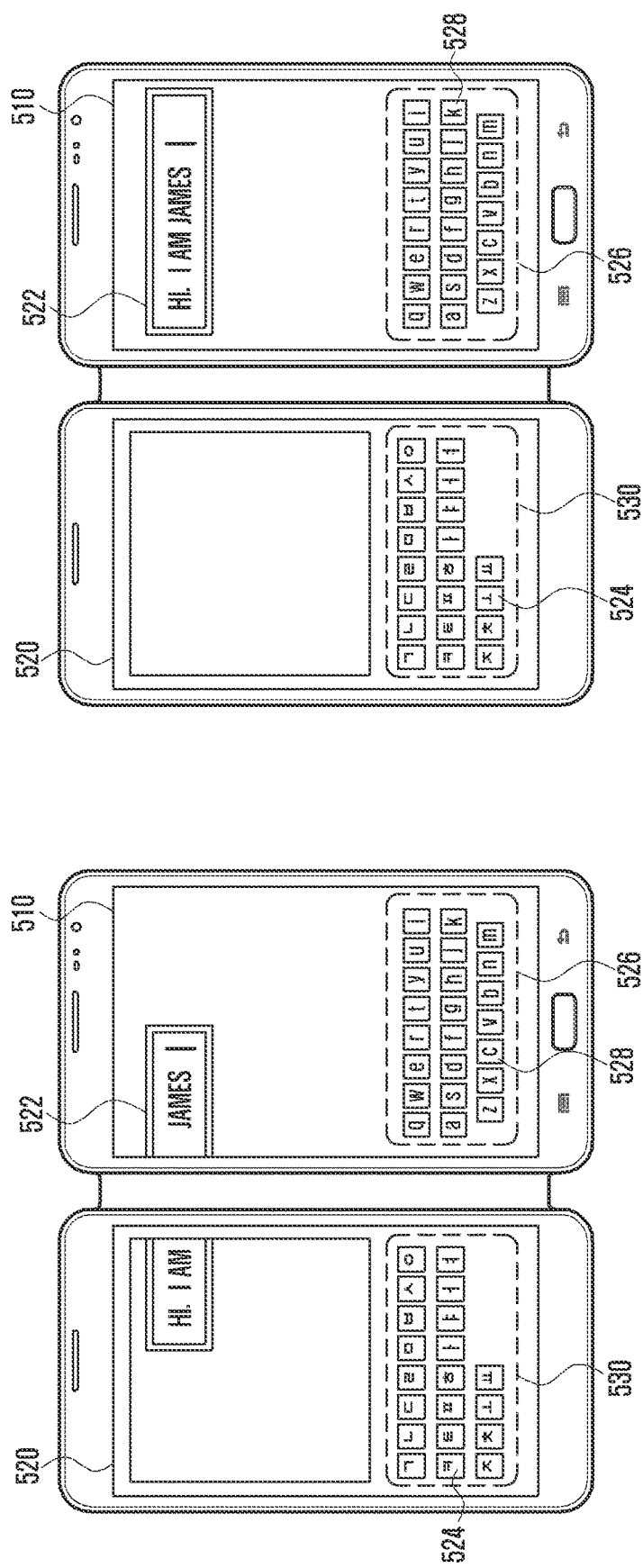

FIG. 5B illustrates a screen for displaying an input window on a display where input is generated among multiple displays in an electronic device according to various embodiments of the present disclosure.

Referring to FIG. 5B, the electronic device (e.g., the electronic device 101) may include, for example, the first and second displays 510 and 520. The electronic device may display the input window 522, for example, through at least a partial region of the first and second displays 510 and 520.

According to an embodiment, based on a user input in relation to the input window 522, the electronic device may move the input window from the currently displayed location (e.g., the second display 520) to a different location (e.g., the first display 510). According to an embodiment, while input is being received through the second input region 530 displayed on the second display 520, when additional input is received through the first input region 526 displayed on the first display 510, the electronic device may move the input window 522 to the first display 510. According to an embodiment, the electronic device may determine whether additional input is received through the first input region 526 displayed on the first display 510 by analyzing the input information and identifying whether the input information corresponds to information (e.g., Alphabet) relevant to the first input region 526, or by identifying whether the location where the input signal is detected corresponds to the first input region 526 (or the first display 510).

According to an embodiment, when the electronic device receives, from a user, a drag or swipe that is initiated at a particular point of the second display 520 and then released at a particular point of the first display 510, the electronic device may adjust the location of the input window 522 based on the particular point where the drag or swipe input is released. According to another embodiment, when the electronic device receives, from the user, input for designating a particular point on the first display 510, the electronic device may adjust the location of the input window 522 based on the designated particular point. According to an embodiment, the location of the input window 522 may be adjusted such that a portion of the input window 522 is displayed through the first display 510 and the rest of the input window 522 is displayed through the second display 520.

Figure 5C:
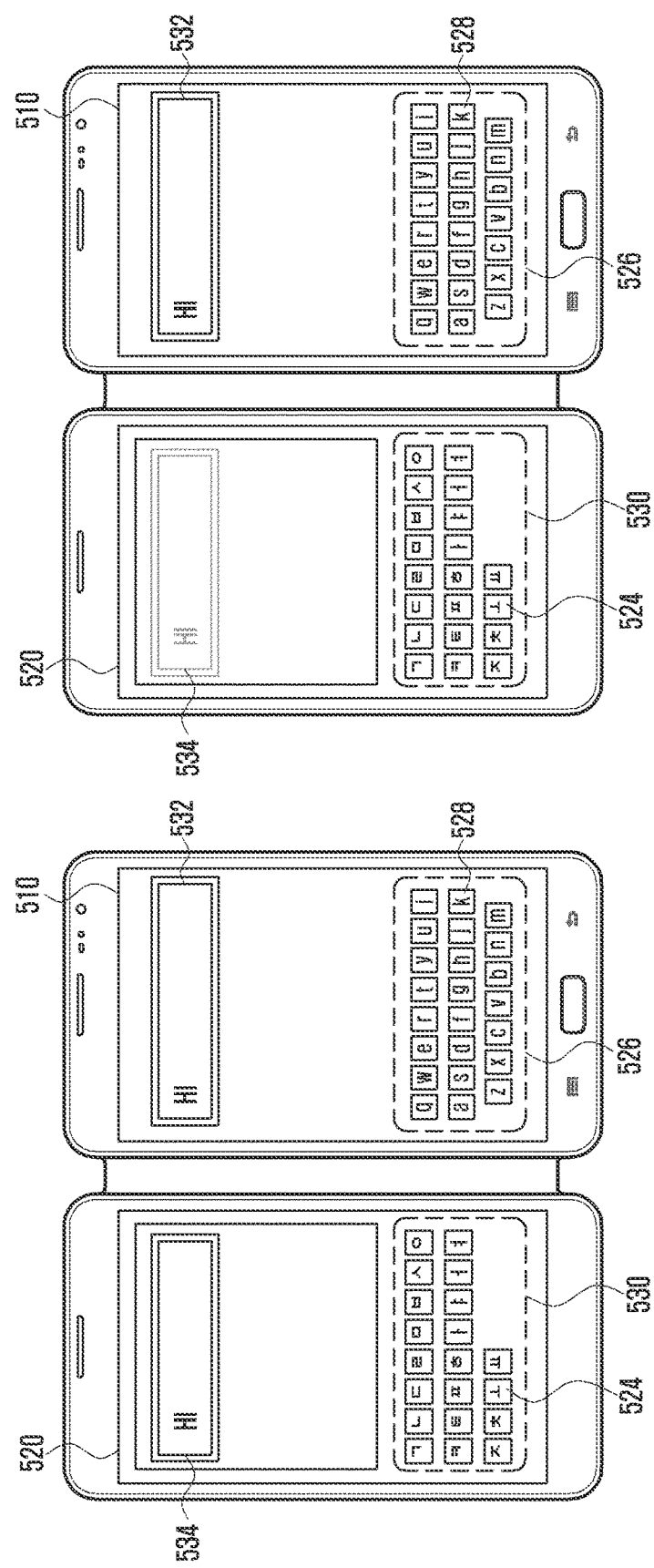

FIG. 5C illustrates a screen for deactivating an input window in an electronic device according to various embodiments of the present disclosure.

Referring to FIG. 5C, the electronic device (e.g., the electronic device 101) may include, for example, the first and second displays 510 and 520. The electronic device may display a first input window 532 through the first display 510 and a second input window 534 through the second display 520. The electronic device may provide, through the first display 510, the first input region 526 as an input means for the first input window 532. In addition, the electronic device may provide, through the second display 520, the second input region 530 as an input means for the second input window 534.

According to an embodiment, the electronic device may activate an input window (e.g., the first input window 532) corresponding to an input region (e.g., the first input region 526) where a user input is generated among the plurality of input windows 532 and 534 and may deactivate the rest of the input windows (e.g., the second input window 534). According to an embodiment, the electronic device may hide the second input window 534 from a user's view or may display the second input window 534 in a state in which visibility or power consumption is low, as a part of the process for deactivating the second input window 534. In addition, the electronic device may display the second input window 534 using an alternative image or color or may activate another application at a lower level than the second input window 534 to superpose the other application on the second input window 534 or replace the second input window 534 with the other application. Furthermore, the electronic device may adjust display attributes (e.g., reflectance or transmittance) of the display region corresponding to the second input window 534 to change the display region to a region (e.g., a mirror display region or a transparent display region) for performing a different function except for the function of displaying the second input window 534.

According to an embodiment, the electronic device may also deactivate the second input region 530 corresponding to the second input window 534, as a part of the process of deactivating the second input window 534. The second input region 530 may be deactivated by the deactivation of the second input window 534 before a predetermined time passes or an event (e.g., a user input) related to the second input region 530 is generated, whereby the visual representation (e.g., a virtual keypad) related to the second input region 530 may be hidden from the user's view or displayed in a state in which visibility is low.

According to an embodiment, the first and second input regions 526 and 530 may correspond to the same language or symbol set or different languages or symbol sets (e.g., an array 528 of the Alphabet and an array 524 of Hangeul consonants and vowels). However, this embodiment is not limited thereto. According to an embodiment, the first and second input regions 526 and 530 may display the corresponding languages or symbol set in the form of a virtual keypad.

Figure 5D:
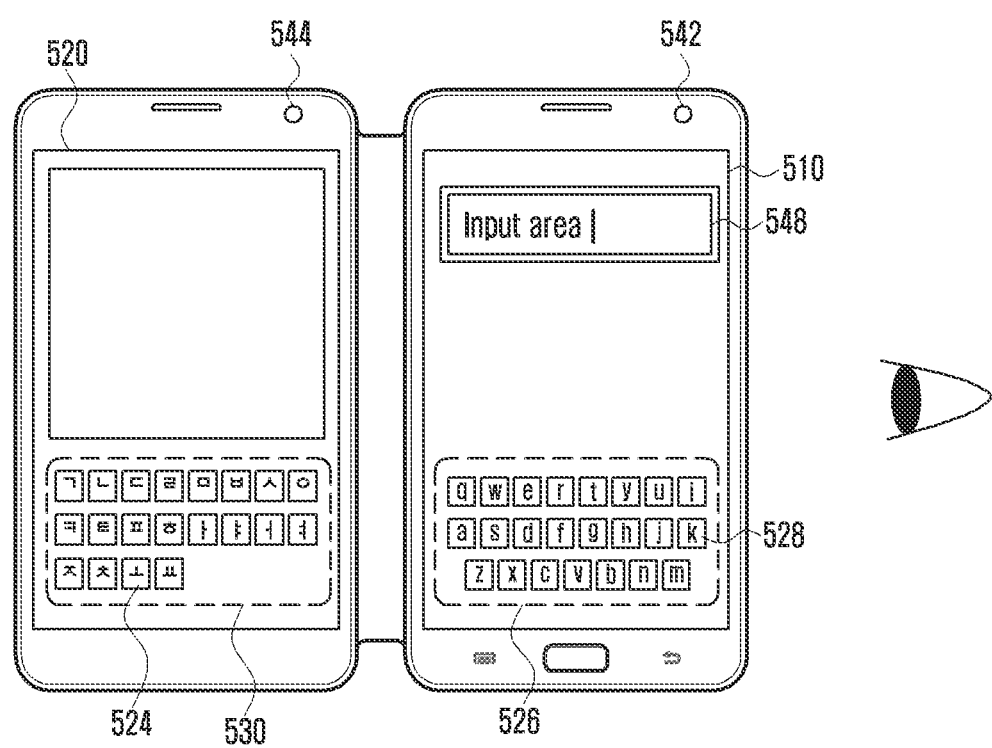

FIG. 5D illustrates a screen for displaying an input window based on a line of sight of a user in an electronic device according to various embodiments of the present disclosure.

Referring to FIG. 5D, the electronic device (e.g., the electronic device 101) may include, for example, the first and second cameras 542 and 544. A first camera 542 may be placed in a main body part of the electronic device in which the first display 510 is located. A second camera 544 may be placed in a sub-body part or a cover of the electronic device in which the second display 520 is located. According to an embodiment, the electronic device may also include only one of the first and second cameras 542 and 544.

According to an embodiment, using at least one of the first and second cameras 542 and 544, the electronic device may determine which of the first and second displays 510 and 520 a user's sight line orients toward. For example, the electronic device may determine that the user's sight line orients toward the first display 510 when the user's eye or iris is detected from an image captured by the first camera 542 and that the user's sight line orients toward the second display 520 when the user's eye or iris is detected from an image captured by the second camera 544. The electronic device may determine the direction of the user's eye or iris (e.g., the line of sight) from an image captured by at least one of the first and second cameras 542 and 544. For example, the electronic device may determine whether the user's eye or iris orients toward at least one of the first and second displays 510 and 520.

According to an embodiment, the electronic device may activate an input region or an input window corresponding to a display toward which the user's sight line orients among the input regions or the input windows corresponding to the multiple displays, respectively. In addition, the electronic device may select a display toward which the user's eye or iris (e.g., the line of sight) orients, as a display to display a particular input region or input window. When the electronic device determines that the user's sight line orients toward the first display 510, the electronic device may activate the first input region 526 corresponding to the first display 510 or display an input window 548 on the first display 510. In addition, as it is determined that the user's sight line does not orient toward the second display 520, the electronic device may deactivate the second input region corresponding to the second display 520.

Figure 6A:
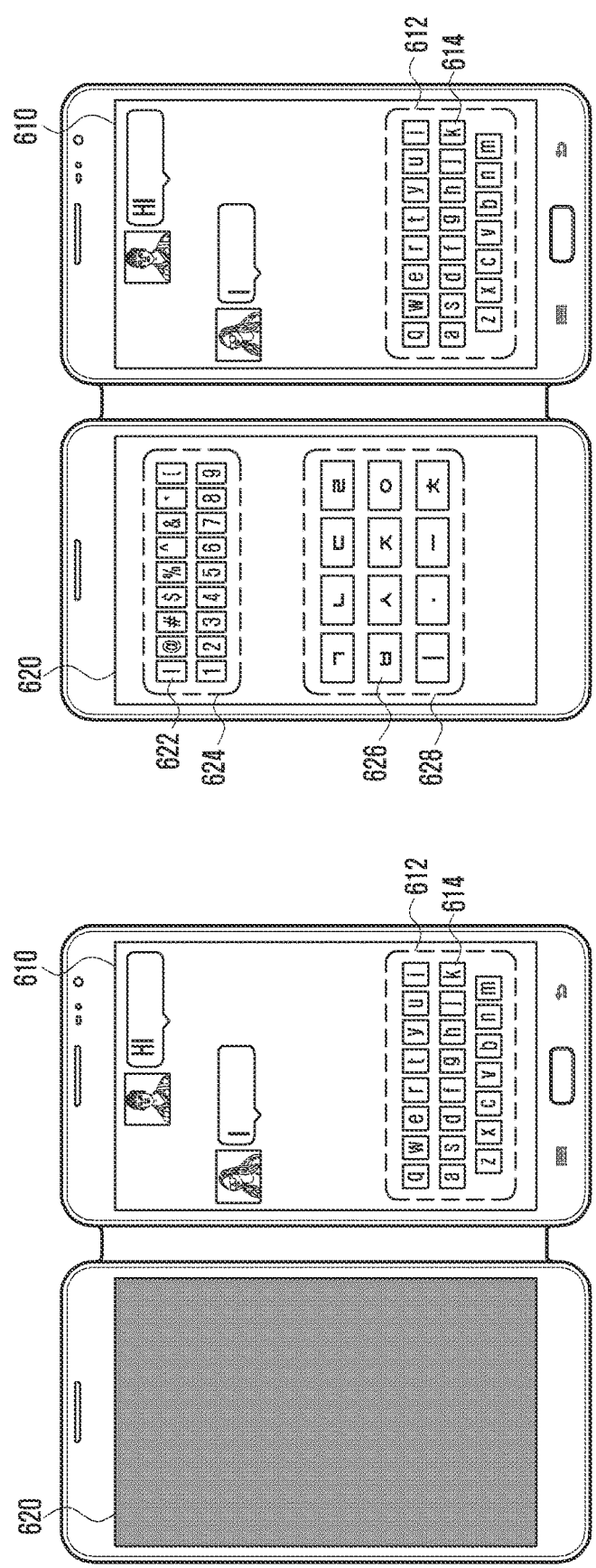
FIGS. 6A and 6B illustrate examples of activating or deactivating a display of an electronic device according to various embodiments of the present disclosure.

FIG. 6A illustrates a function of displaying an input region by activating an deactivated display in an electronic device according to various embodiments of the present disclosure.

Referring to FIG. 6A, in the electronic device (e.g., the electronic device 101) including first and second displays 610 and 620, the second display 620 may be activated (e.g., turned on, unlocked, or in a wakeup mode) in cases where the second display 620 has been deactivated (e.g., turned off or in a sleep mode or a locking mode). The electronic device may determine whether to convert the second display 620 thereof into an activation state based on information or a user input (e.g., particular key input) acquired using a sensor functionally connected thereto. For example, in cases where a user selects a particular language or symbol in an input region 612 displayed on the first display 610, the electronic device may activate the second display 620 when information (e.g., a different language or symbol) associated with the language or symbol has to be additionally displayed on the second display 620.

According to an embodiment, the electronic device may display, through the second display 620, a second input region 628 corresponding to a second language 626 or a third input region 624 corresponding to a second symbol 622. The electronic device may display, through the first display 610, the first input region 612 corresponding to a first language 614.

Figure 6B:
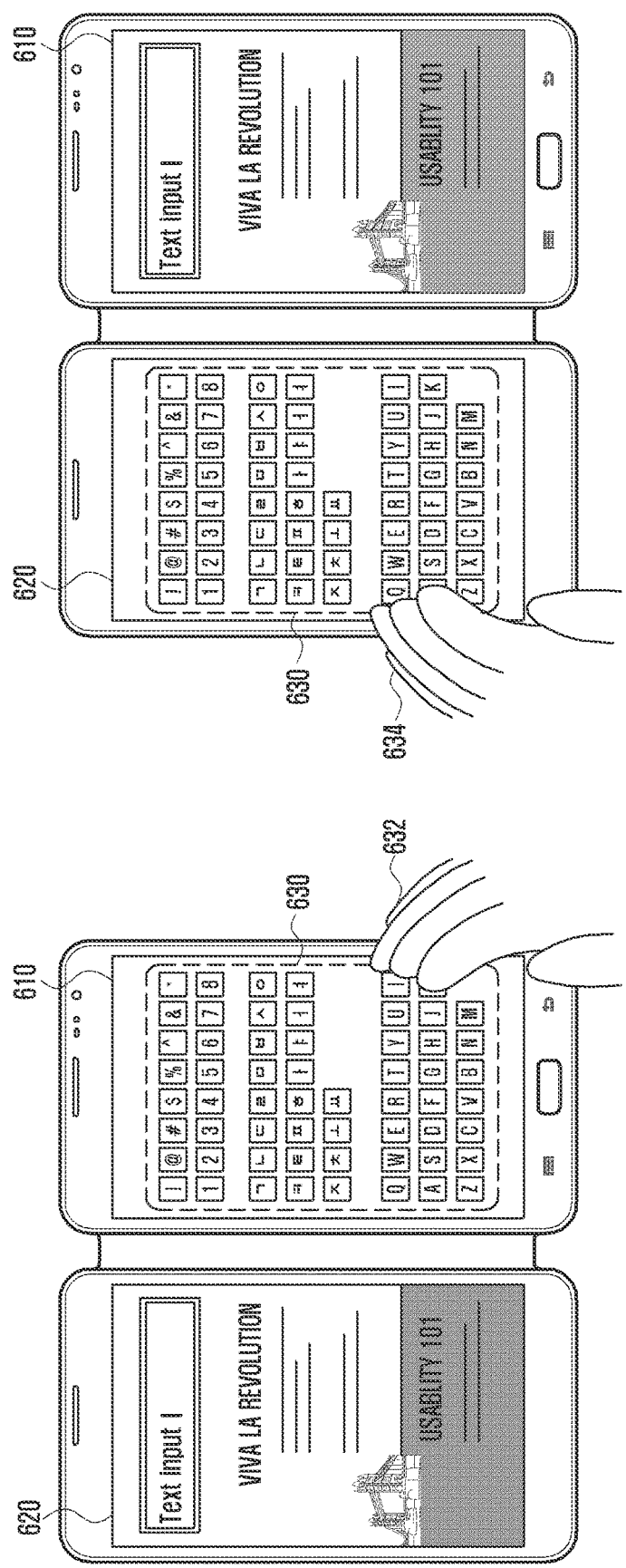

FIG. 6B illustrates a screen for displaying an input region based on a grip position of an electronic device according to various embodiments of the present disclosure.

Referring to FIG. 6B, according to various embodiments, the electronic device (e.g., the electronic device 101) including the first and second displays 610 and 620 may identify a user's grip position. In a method of identifying the user's grip position, the electronic device may identify which of the first and second displays 610 and 620 the user grasps, using a sensor (e.g., a touch sensor, a fingerprint sensor, a temperature sensor, or an electrostatic sensor) functionally connected thereto.

According to an embodiment, in cases where the user's grip position 632 corresponds to the first display 610, the electronic device may display an input region 630 on the first display 610 grasped by the user. For example, while an application used by the user is displayed on the first display 610, when the identification result of the user's grip position 632 shows that the user grasps at least a part of the first display 610, the electronic device may display an input region 630 through the first display 610 and the application, which was displayed on the first display 610, through the second display 620.

According to an embodiment, in cases where the user's grip position 634 corresponds to at least a part of the second display 620, the electronic device may display the input region 630 through the second display 620. In this case, the electronic device may move the application, which was previously displayed through the second display 620, to the first display 610 to display it.

Figure 7A:
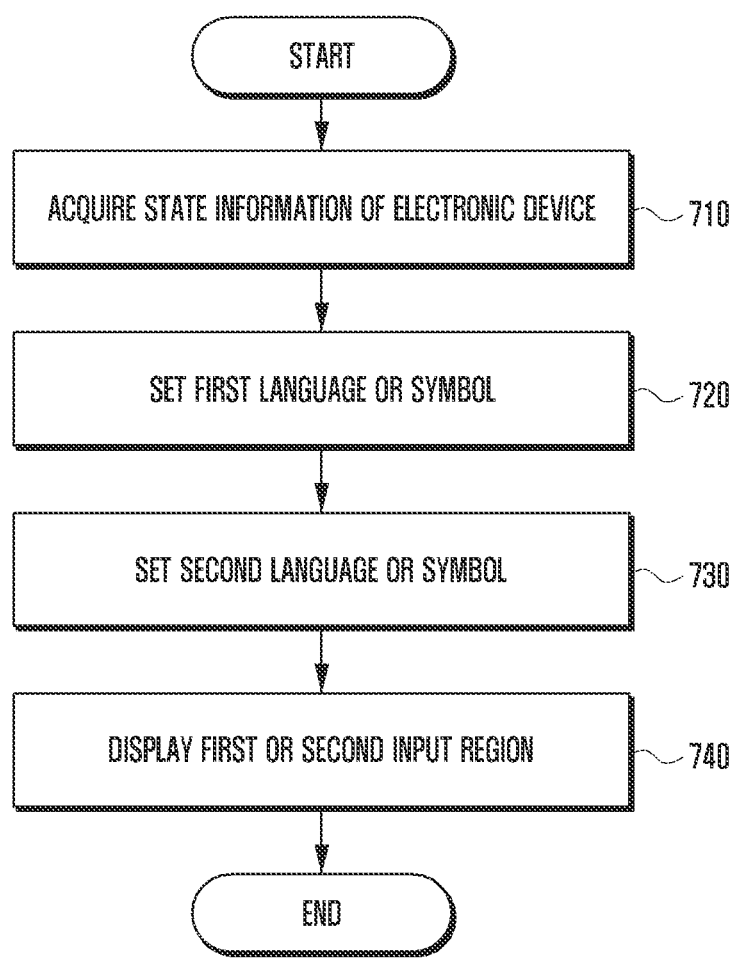
FIGS. 7A and 7B are flowcharts illustrating methods of displaying an input region based on situation information in an electronic device according to various embodiment of the present disclosure.

FIG. 7A is a flowchart illustrating a method of displaying input regions through a plurality of displays based on situation information of an electronic device according to various embodiments of the present disclosure.

Referring to FIG. 7A, according to an embodiment, the state information of the electronic device (e.g., the electronic device 101) may include at least one of, for example, an application executed in the electronic device, text displayed in the electronic device, a location of the electronic device, an On/Off state of the electronic device, an activation state and a location (e.g., up, down, left, or right) of a display, a location where a user grasps the electronic device, a state in which the electronic device is placed (on a desk or a user's hand), a user's sight line, a user's gesture, and a relative distance between multiple displays. The electronic device may set a first language or symbol or a second language or symbol based on the state information.

In operation 710, a display control module (e.g., the display control module 170) of the electronic device may acquire, for example, state information of the electronic device. For example, the display control module may identify the type of an application (e.g., a game application, a drawing instrument application, a memo application, a calendar application, a messenger application, an e-mail application, or a web browser application) that is executed in the electronic device. In addition, the display control module may acquire information on text (e.g., chat text of a messenger or a country code in a URL of a web browser) that is displayed in the application.

According to an embodiment, the display control module may acquire the state information of the electronic device (e.g., a location, a position, a grip state, a grip position, a user's sight line, or a user's gesture) using a sensor functionally connected to the electronic device. According to an embodiment, the display control module may acquire situation information of the electronic device associated with a user (e.g., the user's sight line, the user's gesture, and the state and location where the user grasps the electronic device), using a camera sensor of the electronic device. According to an embodiment, the display control module may acquire the position of the electronic device (e.g., up, down, left, or right) using a six-axis sensor of the electronic device.

In operation 720, the display control module may determine a first language or symbol set based on the state information of the electronic device which has been acquired in operation 710. For example, in cases where a counterpart sends a text message in Chinese language in an application (e.g., a messenger application) executed in the electronic device, the first language may be set as the Chinese language. For example, in cases where an application executed in the electronic device is a game application, a keypad associated with the game application may be set as the first symbol set.

In operation 730, the display control module may set a second language or symbol set based on the state information of the electronic device which has been acquired in operation 710. For example, in cases where an application executed in the electronic device is a web browser application, the display control module may analyze national information (e.g., us, cn, or kr) in the Uniform Resource Locator (URL) of the web browser to set the language suitable for the corresponding country as the second language or symbol set.

In operation 740, the display control module may display a first input region or a second input region on a first display (e.g., the first display 151) or a second display (e.g., the second display 152) based on the state information of the electronic device which has been acquired in operation 710. For example, based on information on the position of the electronic device (e.g., up, down, left, or right), the display control module may display, on the lower side display, the first or second input region, which was displayed on the upper side display, when the position of the electronic device is changed.

Figure 7B:
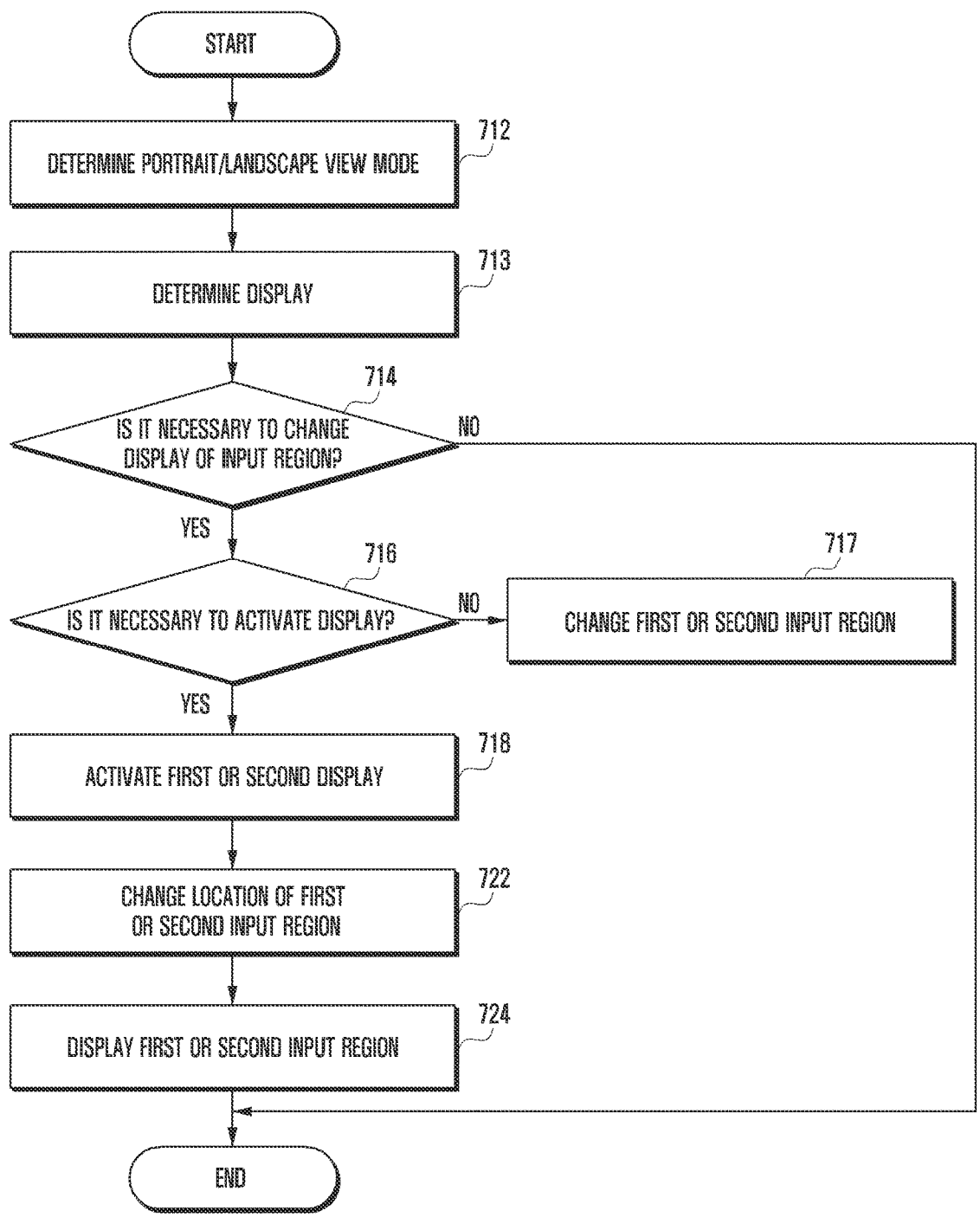

FIG. 7B is a flowchart illustrating a method of displaying an input region depending upon information on the position (e.g., up, down, left, or right) of an electronic device according to various embodiments of the present disclosure.

Referring to FIG. 7B, in operation 712, the electronic device (e.g., the electronic device 101) may determine a portrait or landscape view mode of a display functionally connected thereto based on information on the position (e.g., up, down, left, or right) of the electronic device. The position information may be acquired using, for example, a sensor (e.g., a six-axis sensor or an acceleration sensor) functionally connected to the electronic device. The electronic device may calculate the horizontal or vertical angle thereof on the basis of the information acquired through the sensor and may determine a portrait or landscape mode based on a predetermined reference.

In operation 713, based on the portrait or landscape mode determined in operation 712, the electronic device may determine a display on which an input region is displayed. In the portrait mode, the electronic device may determine a lower side display among a plurality of displays as the display to display the input region.

According to an embodiment, in the landscape mode, an input region may be changed from a first display to a second display or from the second display to the first display depending upon a user's setting information (e.g., display the input region on the left or right side) or the user's grip position (e.g., the location where the user grasps a display with his/her hand).

In operation 714, the electronic device may determine whether to change the display of the input region according to the display determination result in operation 713.

The electronic device may display a first or second input region through the display determined in operation 713 when it is determined in operation 714 that the display of the input region does not need to be changed.

In operation 716, the electronic device may determine whether the display needs to be activated based on activation information (e.g., ON, OFF, sleep, or deep sleep) of the display when it is determined in operation 714 that the display of the input region needs to be changed.

In operation 717, the electronic device may perform a change between the first and second input regions (e.g., change the position of the display) when it is determined in operation 716 that the display does not need to be activated. For example, if the first input region is displayed on the first display and the second input region is displayed on the second display, the electronic device may display the second input region through the first display and the first input region through the second display.

In operation 718, the electronic device may activate at least one of the first and second displays. For example, when the first or second display is in an deactivated state (e.g., OFF, sleep, or deep sleep state), the electronic device may activate (e.g., turn on or wakeup) the first or second display.

In operation 722, the electronic device may change the locations of the first and second input regions. For example, when the first input region is displayed on the first display and the second input region is displayed on the second display, the electronic device may change the locations of the first and second input regions.

According to an embodiment, the locations of the first and second input regions may be changed to at least one of the first and second displays.

In operation 724, the electronic device may display the first or second input region on the first or second display which has been determined in operation 713. For example, in cases where the second display is located below the first display, the first or second input region may be displayed on the second display.

According to an embodiment, the electronic device may display the first or second input region based on a state in which the user grasps the electronic device. For example, when the user grasps the left side display, the electronic device may display the input region on the display which the user grasps among multiple displays.

According to an embodiment, a method may include displaying a first input region corresponding to a first language or symbol set through a first or second display of an electronic device and displaying a second input region corresponding to a second language or symbol set through the first or second display. According to an embodiment, at least one of the first and second input regions may include a keypad.

According to an embodiment, the first input region may be displayed through the first display and the second input region may be displayed through the second display.

According to an embodiment, the first and second input regions may be simultaneously displayed at least temporarily.

According to an embodiment, a first one of the first and second input regions may be automatically displayed based on an attribute of information displayed in an input window corresponding to a second one of the first and second input regions or the type of an application that provides the information.

According to an embodiment, at least one of the first and second input regions may be automatically displayed based on at least one of a location or state (e.g., power on/off state or a position) of the electronic device, a state (activation/deactivation or capacity) of the first or second display, a distance between the first and second displays, and a user's sight line or gesture.

According to an embodiment, the method may further include displaying a first input acquired through the first input region and a second input acquired through the second input region in the same input window (e.g., a chat window, a password input window, or an address input window).

According to an embodiment, the method may further include displaying a first input acquired through the first input region and a second input acquired through the second input region in different input windows, respectively.

According to an embodiment, the method may further include deactivating an input window corresponding to an input region where input is not generated among the first and second input regions.

According to an embodiment, the deactivating of the input window may include hiding the corresponding input window, changing the size or shape of the corresponding input window, or displaying additional information.

Figure 8:
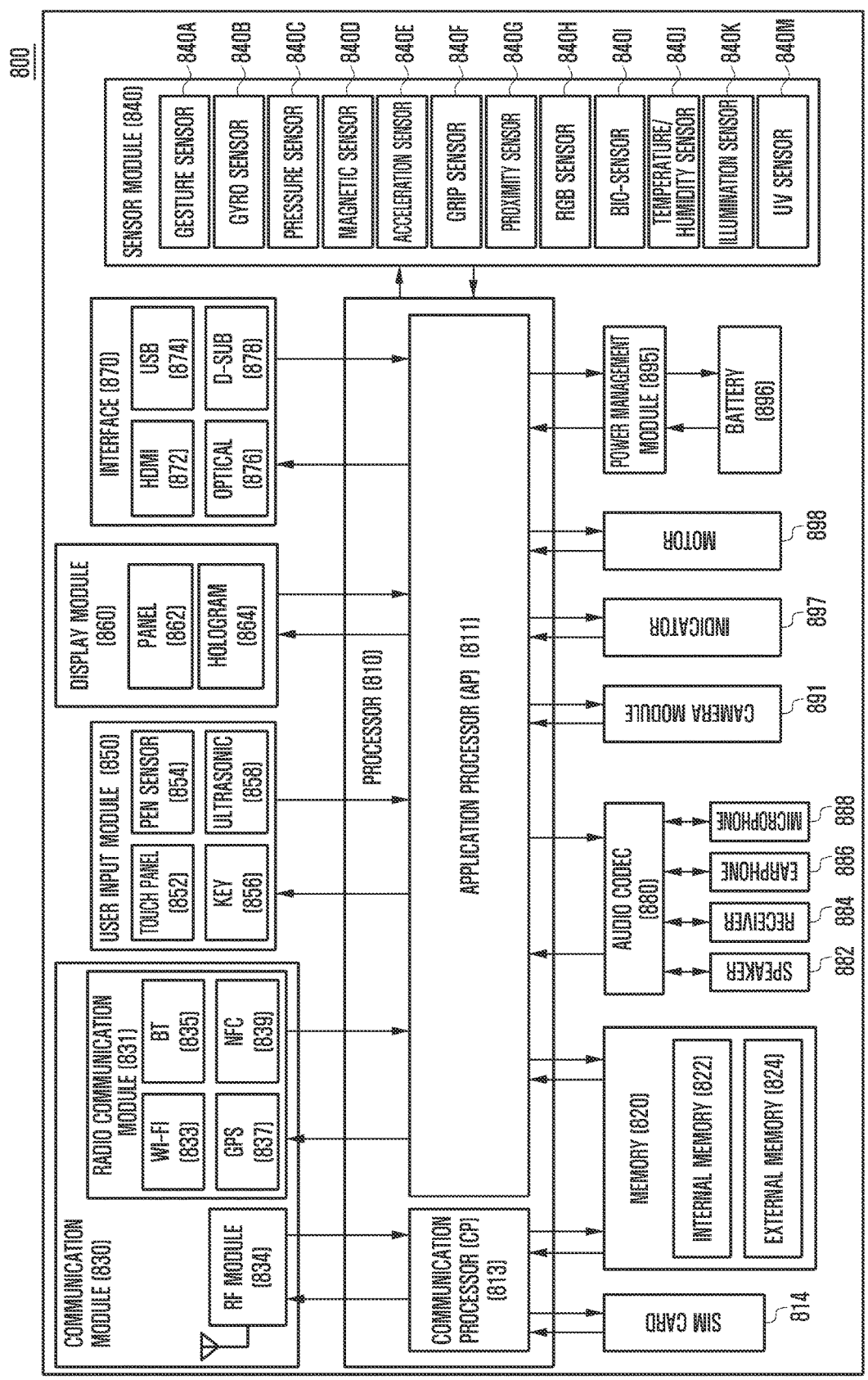
FIG. 8 schematically illustrates hardware according to various embodiments of the present disclosure.

FIG. 8 is a block diagram illustrating a configuration of the electronic device according to various embodiments of the present disclosure. The electronic device 800 may be of the whole or a part of the electronic device 101.

Referring to FIG. 8, the electronic device 800 may include an processor 810, a communication module 830, a Subscriber Identity Module (SIM) card 814, a memory 820, a sensor module 840, a user input module 850, a display module 860, an interface 870, an audio codec 880, a camera module 891, a power management module 895, a battery 896, an indicator 897, and a motor 898.

The processor 810 may include an Application Processor (AP) 811 that may operate an Operating System (OS) and/or application programs to control a plurality of hardware and/or software components connected to the AP 810 and perform data-processing and operations on multimedia data. For example, the AP 810 may be implemented in the form of System on Chip (SoC). According to an embodiment, the AP 810 may include a Graphic Processing Unit (GPU) (not shown). Also, the processor 810 may include a Communication Processor (CP) 813.

The communication module 830 (e.g., communication interface 160) may perform data communication with other electronic devices (e.g., electronic device 104 and server 106) through a network. According to an embodiment, the communication module 830 may include a Radio Frequency (RF) module 834 and a radio communication module 831. The radio communication module 831 may include a Wi-Fi module 833, a BT module 835, a GPS module 837, and an NFC module 839.

The communication module 830 is responsible for voice and video communication, text messaging, and Internet access services through a communication network (e.g., LTE, LTE-A, CDMA, WCDMA, UMTS, WiBro, and GSM networks). The communication module 830 may perform identification and authentication of electronic devices in the communication network using the SIM card 814. According to an embodiment, communication module 830 may perform at least one of the functions of the AP 811. For example, the communication module 830 may perform at least a part of the multimedia control function.

According to an embodiment, the communication module 830 may include the CP 813. The communication module 830 may be implemented in the form of SOC. Although the communication module 830, the memory 820, and the power management module 895 are depicted as independent components separated from the processor 810, the present disclosure is not limited thereto but may be embodied in a way that the processor 810 includes at least one of the components (e.g., communication module 830).

According to an embodiment, each of the processor 810 and the communication module 830 may load a command or data received from at least one of the components on a non-volatile or volatile memory and process the command or data. The processor 810 or the communication module 830 may store the data received from other components or generated by at least one of other components in the non-volatile memory.

Each of the Wi-Fi module 833, the BT module 835, the GPS module 837, and the NFC module 839 may include a processor for processing the data it transmits/receives. Although the Wi-Fi module 833, the BT module 835, the GPS module 837, and the NFC module 839 are depicted as independent blocks; at least two of them may be integrated in the form of SoC.

The RF module 834 is responsible for data communication, e.g., transmitting/receiving RF signals. Although not depicted, the RF module 834 may include a transceiver, a Power Amp Module (PAM), a frequency filter, and a Low Noise Amplifier (LNA). The RF module 834 also may include the elements for transmitting/receiving electric wave in free space, e.g., conductor or conductive wire. Although FIG. 8 is directed to the case where the Wi-Fi module 833, the BT module 835, the GPS module 837, and the NFC module 839 are sharing the RF module 834, the present disclosure is not limited thereto but may be embodied in a way that at least one of the Wi-Fi module 833, the BT module 835, the GPS module 837, and the NFC module 839 transmits/receives RF signals an independent RF module.

The SIM card 814 may be designed so as to be inserted into a slot formed at a predetermined position of the electronic device. The SIM card 814 may store unique identity information (e.g., Integrated Circuit Card Identifier (ICCID)) or subscriber information (e.g., International Mobile Subscriber Identity (IMSI)).

The memory 820 (e.g., memory 80) may include at least one of the internal memory 822 and an external memory 824. The internal memory 822 may include at least one of a volatile memory (e.g., Dynamic Random Access Memory (DRAM), Static RAM (SRAM), Synchronous Dynamic RAM (SDRAM) or a non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to an embodiment, the internal memory 822 may be a Solid State Drive (SSD). The external memory 824 may be a flash drive such as Compact Flash (CF), Secure Digital (SD), micro-SD, Mini-SD, extreme Digital (xD), and Memory Stick. The external memory 824 may be connected to the electronic device 800 through various interfaces functionally. According to an embodiment, the electronic device 800 may include a storage device (or storage medium) such as hard drive.

The sensor module 840 may measure physical quantity or check the operation status of the electronic device 800 and convert the measured or checked information to an electric signal. The sensor module 840 may include at least one of gesture sensor 840A, Gyro sensor 840B, barometric sensor 840C, magnetic sensor 840D, acceleration sensor 840E, grip sensor 840F, proximity sensor 840G, color sensor 840H (e.g., Red, Green, Blue (RGB) sensor), bio sensor 840I, temperature/humidity sensor 840J, illuminance sensor 840K, and Ultra Violet (UV) sensor 840M. Additionally or alternatively, the sensor module 840 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 840 may further include a control circuit for controlling at least one of the sensors included therein.

The user input module 850 may include a touch panel 852, a (digital) pen sensor 854, keys 856, and an ultrasonic input device 858. The touch panel 852 may be one of capacitive, resistive, infrared, microwave type touch panel. The touch panel 852 may include a control circuit. In the case of the capacitive type touch panel, it is possible to detect physical contact or approximation. The touch panel 852 may further include a tactile layer. In this case, the touch panel 852 may provide the user with haptic reaction.

The (digital) pen sensor 854 may be implemented with a sheet with the same or similar way as touch input of the user or a separate recognition sheet. The keys 856 may include physical buttons, optical key, and keypad. The ultrasonic input device 858 is a device capable of checking data by detecting sound wave through a microphone 888 and may be implemented for wireless recognition. According to an embodiment, the electronic device 800 may receive the user input made by means of an external device (e.g., computer or server) connected through the communication module 830.

The display module 860 (e.g., display 150) may include a panel 862 and a hologram device 864. The panel 862 may be a Liquid Crystal Display (LCD) panel or an Active Matrix Organic Light Emitting Diodes (AMOLED) panel. The panel 862 may be implemented so as to be flexible, transparent, and/or wearable. The panel 862 may be implemented as a module integrated with the touch panel 852. The hologram device 864 may present 3-dimensional image in the air using interference of light. According to an embodiment, the display module 860 may include a control circuit for controlling the panel 862 and the hologram device 864.

The interface 870 may include a High-Definition Multimedia Interface (HDMI) 872, a Universal Serial Bus (USB) 874, an optical interface 876, and a D0subminiature (D-sub) 878. The interface 870 may include the communication interface 160 as shown in FIG. 1. Additionally or alternatively, the interface 870 may include a Mobile High-definition Link (MHL) interface, a SD/MMC card interface, and infrared Data Association (irDA) standard interface.

The audio module 880 may convert sound to electric signal and vice versa. At least a part of the audio module 880 may be included in the input/output interface 140 as shown in FIG. 1. The audio module 880 may process the audio information input or output through the speaker 882, the receiver 884, the earphone 886, and the microphone 888.

The camera module 891 is a device capable of taking still and motion pictures and, according to an embodiment, includes at least one image sensor (e.g., front and rear sensors), a lens (not shown), and Image Signal Processor (ISP) (not shown), and a flash (e.g., LED or xenon lamp) (not shown).

The power management module 895 may manage the power of the electronic device 800. Although not shown, the power management module 895 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need for an extra circuit for wireless charging such as coil loop, resonance circuit, and diode.

The battery gauge may measure the residual power of the battery 896, charging voltage, current, and temperature. The battery 896 may store or generate power and supply the stored or generated power to the electronic device 800. The battery 896 may include a rechargeable battery or a solar battery.

The indicator 897 may display operation status of the electronic device 800 or a part of the electronic device, booting status, messaging status, and charging status. The motor 898 may converts the electronic signal to mechanical vibration. Although not shown, the electronic device 800 may include a processing unit (e.g., GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

As described above, the electronic device operating method and apparatus of the present disclosure is capable of providing diverse screen displays in adaptation to various conditions to implement optimal environment for utilizing the electronic device, resulting in improvement of user convenience. Also, the electronic device operating method and apparatus of the present disclosure is advantageous in terms of facilitating navigation between folders by sorting the folders by hierarchical level.

The above enumerated components of the electronic device of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

Figure 9:
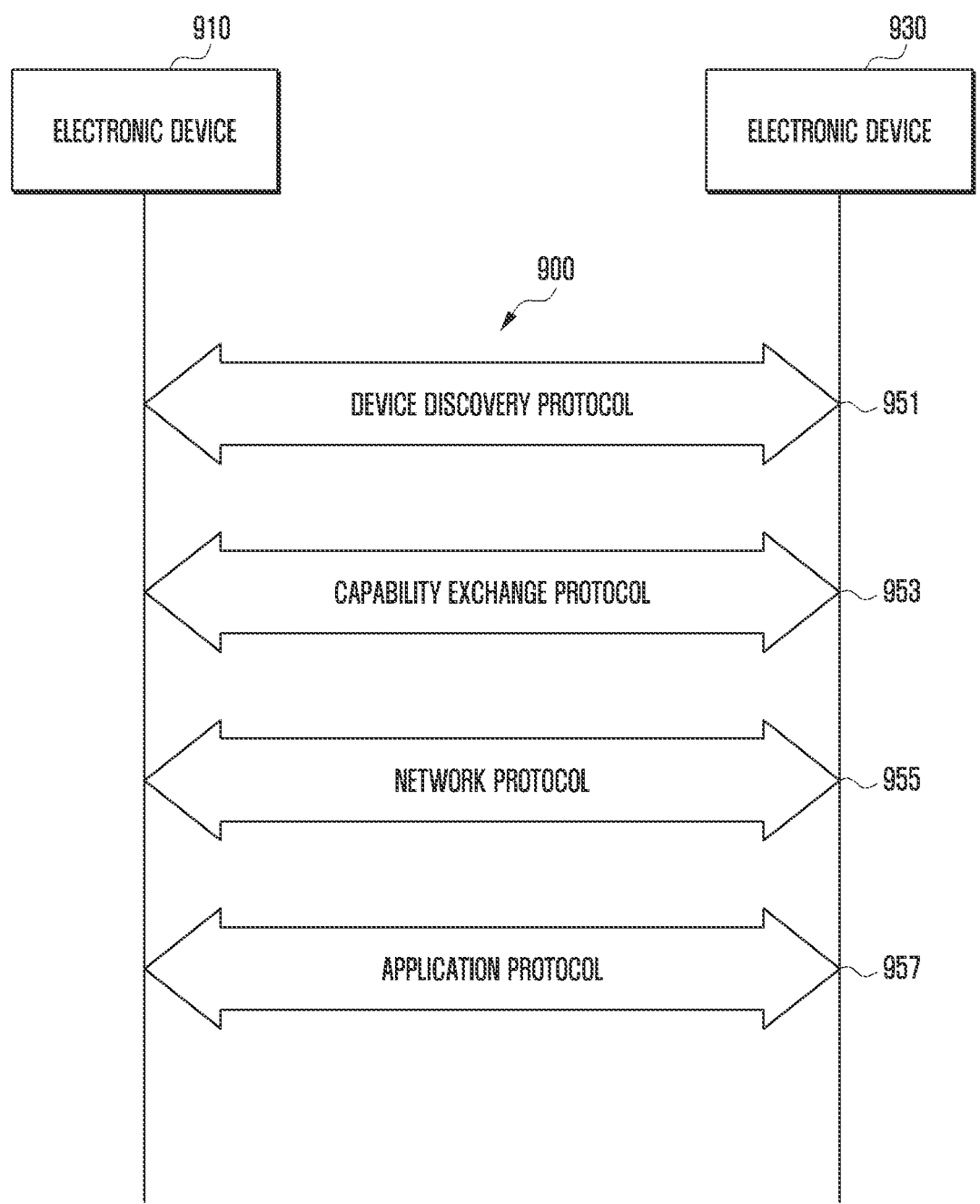
FIG. 9 schematically illustrates communication protocols between a plurality of electronic devices according to various embodiments of the present disclosure.

FIG. 9 illustrates communication protocols 900 between a plurality of electronic devices (e.g., an electronic device 910 and an electronic device 930) according to various embodiments.

Referring to FIG. 9, for example, the communication protocols 900 may include a device discovery protocol 951, a capability exchange protocol 953, a network protocol 955, and an application protocol 957.

According to an embodiment, the device discovery protocol 951 may be a protocol by which the electronic devices (e.g., the electronic device 910 and the electronic device 930) detect external devices capable of communicating with the electronic devices, or connect with the detected external electronic devices. For example, the electronic device 910 (e.g., the electronic device 101) may detect the electronic device 930 (e.g., the electronic device 104) as an electronic device capable of communicating with the electronic device 910 through communication methods (e.g., WiFi, BT, USB, or the like) which are available in the electronic device 910, by using the device discovery protocol 951. In order to connect with the electronic device 930 for communication, the electronic device 910 may obtain and store identification information on the detected electronic device 930, by using the device discovery protocol 951. The electronic device 910 may initiate the communication connection with the electronic device 930, for example, based on at least the identification information.

According to an embodiment, the device discovery protocol 951 may be a protocol for authentication between a plurality of electronic devices. For example, the electronic device 910 may perform authentication between the electronic device 910 and the electronic device 930, based on at least communication information {e.g., Media Access Control (MAC), Universally Unique Identifier (UUID), Subsystem Identification (SSID), Internet Protocol (IP) address} for connection with the electronic device 930.

According to an embodiment, the capability exchange protocol 953 may be a protocol for exchanging information related to service functions which can be supported by at least one of the electronic device 910 or the electronic device 930. For example, the electronic device 910 and the electronic device 930 may exchange information on service functions which are currently supported by each electronic device with each other through the capability exchange protocol 1053. The exchangeable information may include identification information indicating a specific service among a plurality of services supported by the electronic device 1010 and the electronic device 1030. For example, the electronic device 1010 may receive identification information for a specific service provided by the electronic device 1030 from the electronic device 1030 through the capability exchange protocol 1053. In this case, the first electronic device 1010 may determine whether the electronic device 1010 can support the specific service, based on the received identification information.

According to an embodiment, the network protocol 955 may be a protocol for controlling the data flow which is transmitted and received between the electronic devices (e.g., the electronic device 910 and the electronic device 930) connected with each other for communication, for example, in order to provide interworking services. For example, at least one of the electronic device 910 or the electronic device 930 may perform the error control or the data quality control, by using the network protocol 955. Alternatively or additionally, the network protocol 955 may determine the transmission format of data transmitted and received between the electronic device 910 and the electronic device 930. In addition, at least one of the electronic device 910 or the electronic device 930 may manage a session (e.g., session connection or session termination) for the data exchange between them, by using the network protocol 955.

According to an embodiment, the application protocol 957 may be a protocol for providing a procedure or information to exchange data related to services which are provided to the external devices. For example, the electronic device 910 (e.g., the electronic device 101) may provide services to the electronic device 930 (e.g., the electronic device 104 or the server 106) through the application protocol 957.

According to an embodiment, the communication protocol 900 may include standard communication protocols, communication protocols designated by individuals or groups (e.g., communication protocols designated by communication device manufacturers or network providers), or a combination thereof.

According to various embodiments, a non-transitory computer readable storage medium is provided in which instructions are stored, wherein the instructions are set such that at least one processor performs at least one operation when the instructions are executed by the at least one processor, and wherein the at least one operation may include an operation of displaying a first input region corresponding to a first language or symbol set through a first or second display of an electronic device and an operation of displaying a second input region corresponding to a second language or symbol set through the first or second display.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method comprising:
   determining a first value and a second value, the first value corresponding to information displayed through a first display of an electronic device and the second value corresponding to information displayed through a second display of the electronic device;
   displaying a first language or symbol set indicating the determined first value in a first input region displayed through the first display; and
   displaying a second language or symbol set indicating the determined second value in a second input region displayed through the second display,
   wherein at least one of the first language or symbol set and the second language or symbol set includes a keypad.

2. The method of claim 1, wherein the first and second input regions are simultaneously displayed at least temporarily.

3. The method of claim 1, wherein a first one of the first and second input regions is automatically displayed based on an attribute of information displayed in an input window corresponding to a second one of the first and second input regions or a type of an application that provides the information.

4. The method of claim 1, wherein at least one of the first or second input regions is automatically displayed based on at least one of a location or state of the electronic device, a state of the first or second display, a distance between the first and second displays, and a user's sight line or gesture.

5. The method of claim 1, further comprising:
   displaying a first input acquired through the first input region and a second input acquired through the second input region in a same input window.

6. The method of claim 1, further comprising:
   displaying a first input acquired through the first input region and a second input acquired through the second input region in different input windows, respectively.

7. The method of claim 1, further comprising:
   deactivating an input window corresponding to an input region where an input is not generated among the first and second input regions.

8. The method of claim 7, wherein the deactivating of the input window comprises:
   hiding the corresponding input window, changing a size or shape of the corresponding input window, or displaying additional information.

9. An electronic device comprising:
   a first display;
   a second display; and
   a processor functionally connected to the plurality of displays,
   wherein the processor is configured to:
      determine a first value and a second value, the first value corresponding to information displayed through the first display and the second value corresponding to information displayed through the second display,
      display a first language or symbol set indicating the determined first value in a first input region displayed through the first display, and
      display a second language or symbol set indicating the determined second value in a second input region displayed through the second display,
   wherein at least one of the first language or symbol set and the second language or symbol set includes a keypad.

10. The electronic device of claim 9, wherein the processor is further configured to receive an input corresponding to an electronic pen, a sound, or a gesture through at least one of the first or second input regions.

11. The electronic device of claim 9, wherein the processor is further configured to change a language or symbol set corresponding to a second one of the first and second input regions based on at least a part of information displayed through a first one of the first and second input regions.

12. The electronic device of claim 9, wherein the processor is further configured to activate at least one of the first or second displays based on an input for at least one of the first or second input regions.

13. The electronic device of claim 9, wherein the processor is further configured to identify national information displayed on a corresponding display among the first and second displays and change a language or symbol set corresponding to the first or second input region based on the national information.

14. The electronic device of claim 9, wherein the processor is further configured to display a third input region corresponding to a third language or symbol set through at least one of the plurality of displays.

15. The electronic device of claim 9, wherein the processor is further configured to acquire input or situation information for the electronic device and move at least one of the first or second input regions from a first one to a second one of the first and second displays based on the input.

16. The electronic device of claim 15, wherein the processor is further configured to acquire an activation state of a corresponding display, among the first and second displays, as the situation information.

17. The electronic device of claim 9, wherein the processor is further configured to select at least one of the first or second displays based on information on a sensor functionally connected to the electronic device and display at least one of the first or second input regions through the at least one display.

18. A non-transitory computer readable storage medium having instructions stored therein, wherein the instructions are set such that at least one processor performs at least one operation when the instructions are executed by the at least one processor, and wherein the at least one operation comprises operations of:
- determining a first value and a second value, the first value corresponding to information displayed through a first display of an electronic device and the second value corresponding to information displayed through a second display of the electronic device;
- displaying a first language or symbol set indicating the determined first value in a first input region displayed through the first display; and
- displaying a second language or symbol set indicating the determined second value in a second input region displayed through the second display,
- wherein at least one of the first language or symbol set and the second language or symbol set includes a keypad.

* * * * *